United States Patent
Luo et al.

(10) Patent No.: US 12,471,136 B2
(45) Date of Patent: Nov. 11, 2025

(54) UPDATING CONFIGURATIONS FOR UNLICENSED CHANNEL ACCESS USING STATUS REPORTS OF AN UNLICENSED BAND

(71) Applicant: QUALCOMM Incorporated, San Diego, CA (US)

(72) Inventors: Jianghong Luo, Skillman, NJ (US); Xiaoxia Zhang, San Diego, CA (US); Jing Sun, San Diego, CA (US); Ozcan Ozturk, San Diego, CA (US); Navid Abedini, Basking Ridge, NJ (US); Junyi Li, Fairless Hills, PA (US); Karl Georg Hampel, Hoboken, NJ (US); Luca Blessent, Whitehouse Station, NJ (US); Naeem Akl, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 17/452,527

(22) Filed: Oct. 27, 2021

(65) Prior Publication Data

US 2022/0295550 A1    Sep. 15, 2022

Related U.S. Application Data

(60) Provisional application No. 63/159,233, filed on Mar. 10, 2021.

(51) Int. Cl.
*H04W 74/0808* (2024.01)
*H04W 16/14* (2009.01)
*H04W 74/00* (2009.01)

(52) U.S. Cl.
CPC ....... *H04W 74/0808* (2013.01); *H04W 16/14* (2013.01); *H04W 74/002* (2013.01)

(58) Field of Classification Search
CPC ............ H04W 74/0808; H04W 16/14; H04W 74/002; H04W 24/10; H04W 48/16
See application file for complete search history.

(56) References Cited

U.S. PATENT DOCUMENTS

| | | | |
|---|---|---|---|
| 2017/0215082 A1* | 7/2017 | Hwang | H04W 16/14 |
| 2018/0124612 A1* | 5/2018 | Babaei | H04W 72/23 |
| 2018/0368205 A1* | 12/2018 | Park | H04W 76/32 |
| 2020/0229241 A1* | 7/2020 | Jeon | H04W 74/0833 |
| 2021/0153245 A1* | 5/2021 | Tooher | H04W 74/008 |
| 2022/0124799 A1* | 4/2022 | Hu | H04L 5/0048 |
| 2022/0167408 A1* | 5/2022 | Lee | H04W 74/0808 |
| 2022/0346174 A1* | 10/2022 | Wang | H04W 74/0808 |
| 2022/0386404 A1* | 12/2022 | Fujishiro | H04W 40/22 |
| 2023/0345532 A1* | 10/2023 | Khirallah | H04W 76/30 |

* cited by examiner

*Primary Examiner* — Ivan O Latorre

(74) *Attorney, Agent, or Firm* — Harrity & Harrity, LLP

(57) ABSTRACT

Various aspects of the present disclosure generally relate to wireless communication. In some aspects, a control node may receive, from a wireless node, a status report of an unlicensed band associated with an unlicensed channel access of the wireless node, wherein the status report indicates listen-before-talk (LBT) failures during the unlicensed channel access of the wireless node. The control node may transmit, to the wireless node, an updated configuration for unlicensed channel access based at least in part on the status report of the unlicensed band. Numerous other aspects are described.

30 Claims, 13 Drawing Sheets

UPDATING CONFIGURATIONS FOR UNLICENSED CHANNEL ACCESS USING STATUS REPORTS OF AN UNLICENSED BAND

CROSS-REFERENCE TO RELATED APPLICATION

This Patent Applications claims priority to U.S. Provisional Patent Application No. 63/159,233, filed on Mar. 10, 2021, entitled "UPDATING CONFIGURATIONS FOR UNLICENSED CHANNEL ACCESS USING STATUS REPORTS OF AN UNLICENSED BAND," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for updating configurations for unlicensed channel access using status reports of an unlicensed band.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a control node includes receiving, from a wireless node, a status report of an unlicensed band associated with an unlicensed channel access of the wireless node, wherein the status report indicates listen-before-talk (LBT) failures during the unlicensed channel access of the wireless node; and transmitting, to the wireless node, an updated configuration for unlicensed channel access based at least in part on the status report of the unlicensed band.

In some aspects, a method of wireless communication performed by a wireless node includes transmitting, to a control node, a status report of an unlicensed band associated with an unlicensed channel access of the wireless node, wherein the status report indicates LBT failures during the unlicensed channel access of the wireless node; and receiving, from the control node, an updated configuration for unlicensed channel access based at least in part on the status report of the unlicensed band.

In some aspects, a control node for wireless communication includes a memory and one or more processors, coupled to the memory, configured to: receive, from a wireless node, a status report of an unlicensed band associated with an unlicensed channel access of the wireless node, wherein the status report indicates LBT failures during the unlicensed channel access of the wireless node; and transmit, to the wireless node, an updated configuration for unlicensed channel access based at least in part on the status report of the unlicensed band.

In some aspects, a wireless node for wireless communication includes a memory and one or more processors, coupled to the memory, configured to: transmit, to a control node, a status report of an unlicensed band associated with an unlicensed channel access of the wireless node, wherein the status report indicates LBT failures during the unlicensed channel access of the wireless node; and receive, from the control node, an updated configuration for unlicensed channel access based at least in part on the status report of the unlicensed band.

In some aspects, a non-transitory computer-readable medium storing a set of instructions for wireless communication includes one or more instructions that, when executed by one or more processors of a control node, cause the control node to: receive, from a wireless node, a status report of an unlicensed band associated with an unlicensed channel access of the wireless node, wherein the status report indicates LBT failures during the unlicensed channel access of the wireless node; and transmit, to the wireless node, an updated configuration for unlicensed channel access based at least in part on the status report of the unlicensed band.

In some aspects, a non-transitory computer-readable medium storing a set of instructions for wireless communication includes one or more instructions that, when executed by one or more processors of a wireless node, cause the wireless node to: transmit, to a control node, a status report of an unlicensed band associated with an unlicensed channel access of the wireless node, wherein the status report indicates LBT failures during the unlicensed channel access of the wireless node; and receive, from the control node, an updated configuration for unlicensed channel access based at least in part on the status report of the unlicensed band.

In some aspects, a control apparatus for wireless communication includes means for receiving, from a wireless apparatus, a status report of an unlicensed band associated with an unlicensed channel access of the wireless apparatus, wherein the status report indicates LBT failures during the unlicensed channel access of the wireless node; and means for transmitting, to the wireless apparatus, an updated configuration for unlicensed channel access based at least in part on the status report of the unlicensed band.

In some aspects, a wireless apparatus for wireless communication includes means for transmitting, to a control apparatus, a status report of an unlicensed band associated with an unlicensed channel access of the wireless apparatus, wherein the status report indicates LBT failures during the unlicensed channel access of the wireless node; and means for receiving, from the control apparatus, an updated configuration for unlicensed channel access based at least in part on the status report of the unlicensed band.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
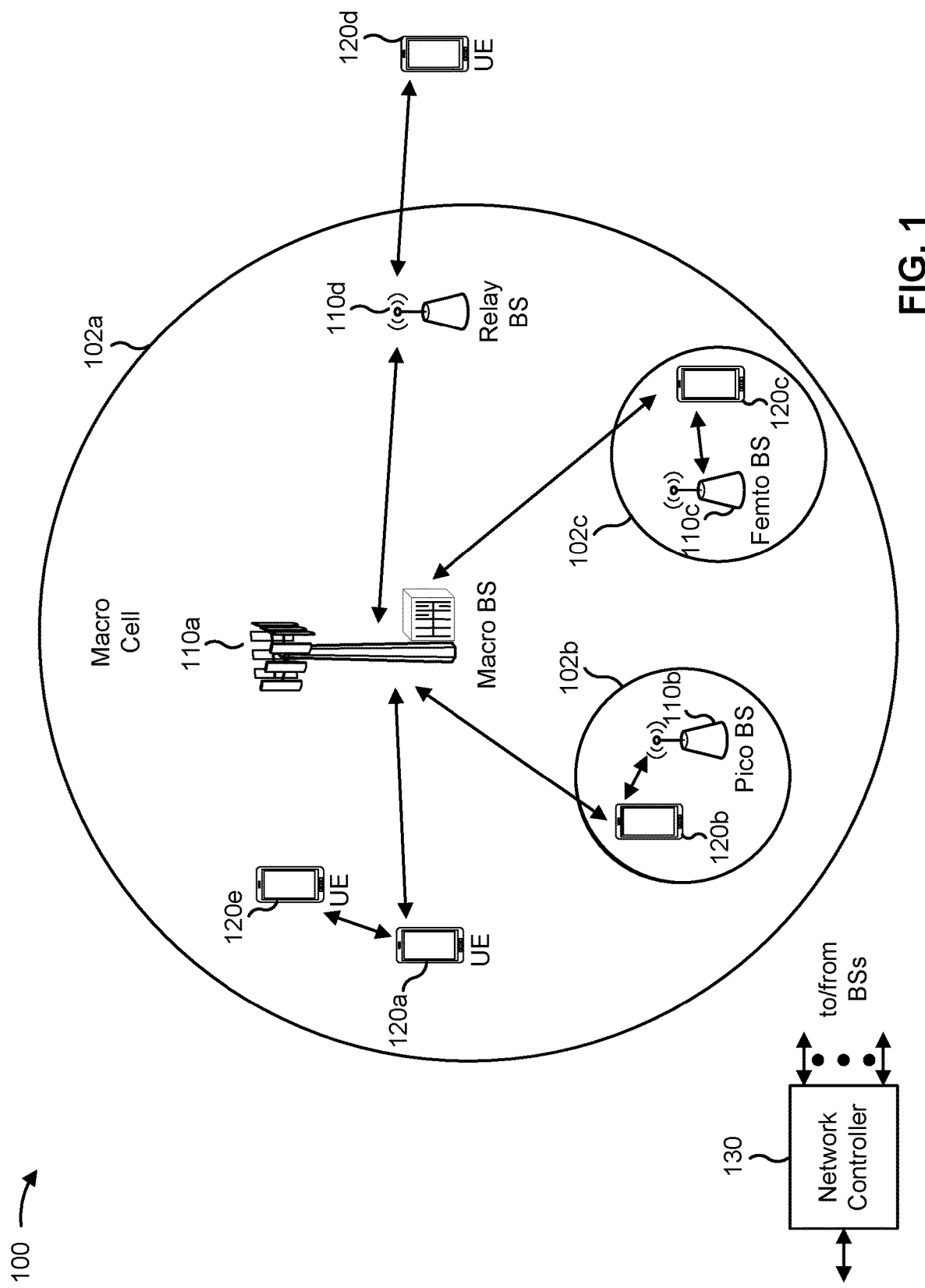
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
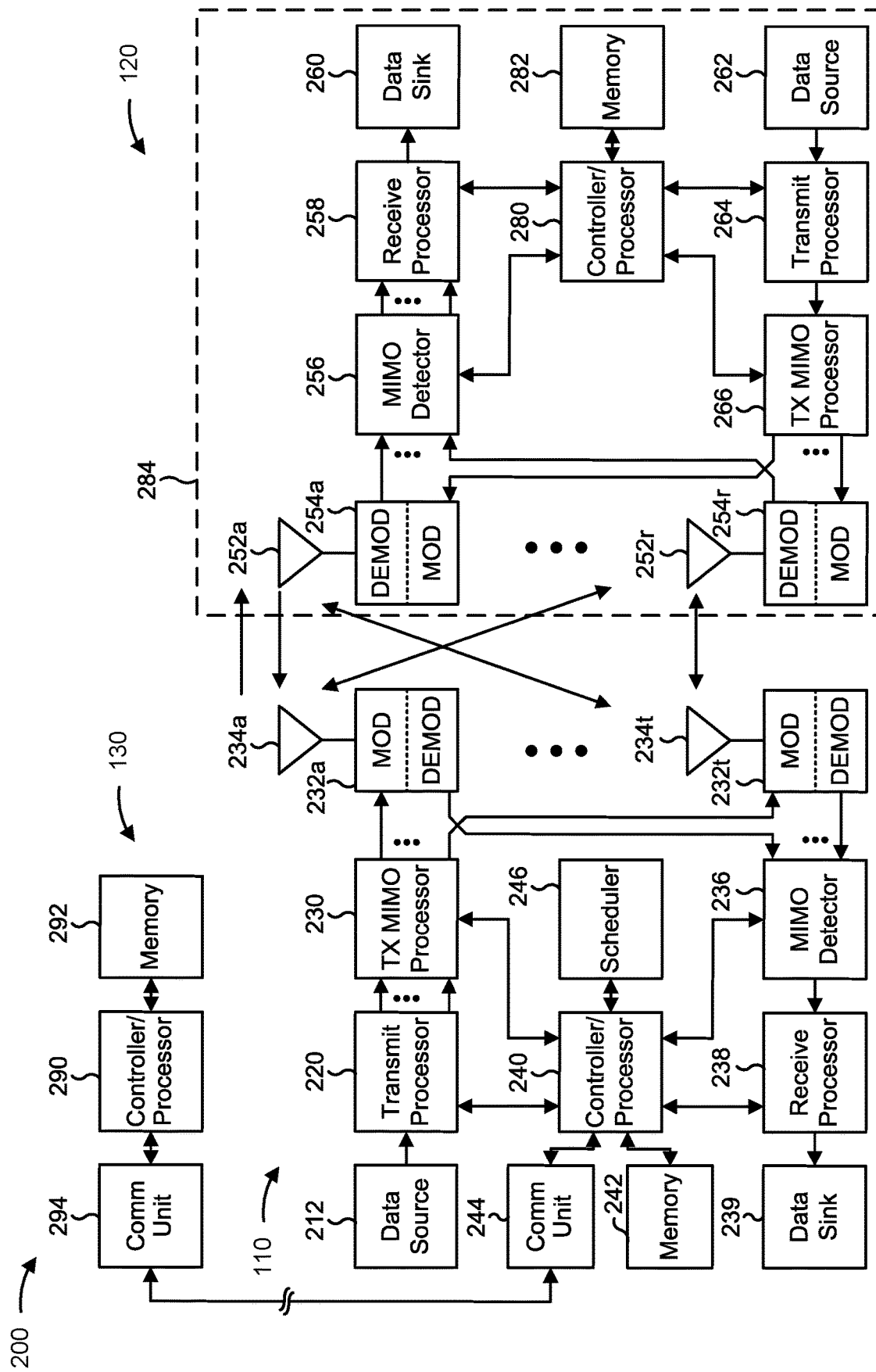
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-11).

The controller/processor 240 of the base station 110, the controller/processor 280 of the UE 120, and/or any other component(s) of FIG. 2 may perform one or more techniques associated with updating configurations for unlicensed channel access using status reports of an unlicensed band, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a control node includes means for receiving, from a wireless node, a status report of an unlicensed band associated with an unlicensed channel access of the wireless node, wherein the status report indicates LBT failures during the unlicensed channel access of the wireless node; and/or means for transmitting, to the wireless node, an updated configuration for unlicensed channel access based at least in part on the status report of the unlicensed band. In some aspects, the means for the control node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the control node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the control node includes means for generating the updated configuration based at least in part on the status report for improving a system performance including an LBT successful rate, e.g., updating configuration and parameters for an unlicensed channel access procedure, and/or updating a resource configuration, and/or updating a topology and/or routing configuration in a multi-hop relay network.

In some aspects, the control node includes means for transmitting, to the wireless node, a configuration for unlicensed channel access, wherein the configuration indicates one or more of: channel access modes, channel access parameters, a measurement configuration, or a status report configuration.

In some aspects, the control node includes means for transmitting, to the wireless node, a request for the status report, wherein the status report is received from the wireless node based at least in part on the request for the status report.

In some aspects, the control node includes means for transmitting, to the wireless node, a configuration that configures a triggering condition for the wireless node to transmit the status report to the control node, wherein the triggering condition is associated with a periodic reporting of the status report or an aperiodic reporting of the status report due to an event occurrence.

In some aspects, the control node includes means for transmitting the status report to a second control node or a peer node.

In some aspects, a wireless node includes means for transmitting, to a control node, a status report of an unlicensed band associated with an unlicensed channel access of the wireless node, wherein the status report indicates LBT failures during the unlicensed channel access of the wireless node; and/or means for receiving, from the control node, an updated configuration for unlicensed channel access based at least in part on the status report of the unlicensed band. In some aspects, the means for the wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless node includes means for receiving, from the control node, a configuration for unlicensed channel access, wherein the configuration indicates one or more of: channel access modes, channel access parameters, a measurement configuration, or a status report configuration.

In some aspects, the wireless node includes means for receiving, from the control node, a request for the status report, wherein the status report is received from the wireless node based at least in part on the request for the status report.

In some aspects, the wireless node includes means for receiving, from the control node, a configuration that configures a triggering condition for the wireless node to transmit the status report to the control node, wherein the triggering condition is associated with a periodic reporting of the status report or an aperiodic reporting of the status report due to an event occurrence.

In some aspects, the wireless node includes means for generating the status report based at least in part on a channel sensing for an intended transmission via an allocation or scheduling; and/or means for generating the status report based on a channel sensing for a virtual transmission for a purpose of generating the status report.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A relatively large amount of spectrum may be available for unlicensed bands. For example, up to 14 GHz, 1.2 GHz, and 640 MHz of bandwidths may be available in the 60 GHz, 6 GHz, and 5 GHz unlicensed bands, respectively.

Channel access procedures may be defined for the unlicensed band below 6 GHz. For example, a node (e.g., a gNB or UE) may be allowed to transmit only when the node passes a channel sensing procedure in accordance with a listen-before-talk (LBT) channel access mechanism. The channel access procedure may involve a load-based LBT or a frame-based LBT (e.g., for semi-static occupancy).

Different types of channel sensing procedures for load-based LBT may be defined for New Radio Unlicensed (NR-U). For example, a Type 1 channel sensing procedure may be a contention window based channel sensing procedure with a random number of sensing slots. Further, a Type2A/2B/2C channel sensing procedure may have a fixed sensing time of 25 µs (with two sensing slots) or 16 µs (with one sensing slot).

Figure 3:
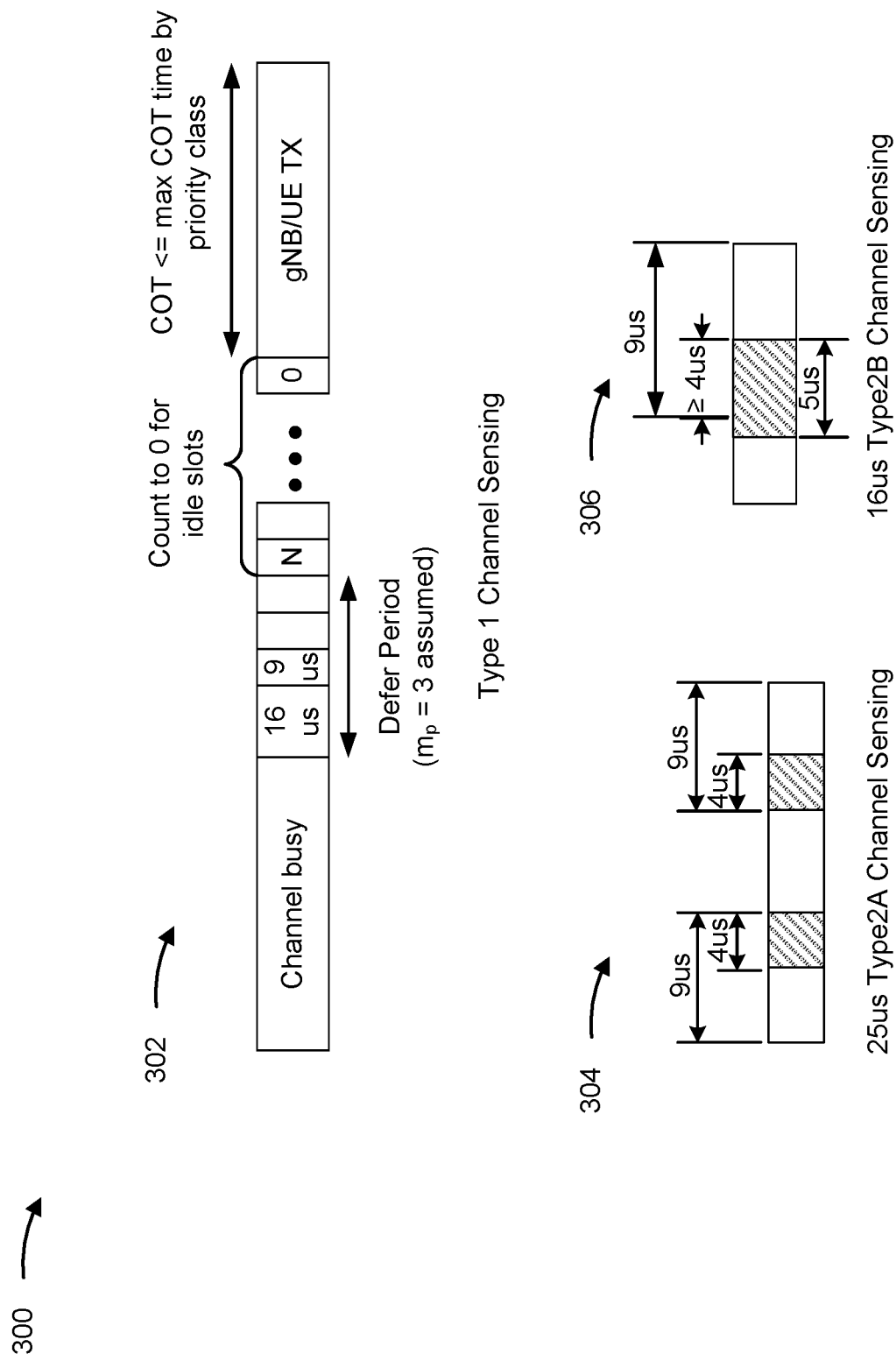
FIG. 3 is a diagram illustrating examples of channel access procedures for an unlicensed band, in accordance with the present disclosure.

FIG. 3 is a diagram illustrating examples 300 of channel access procedures for an unlicensed band, in accordance with the present disclosure.

As shown by reference number 302, a Type 1 channel sensing procedure may involve a channel busy duration, which may be followed by a defer period and a quantity of idle slots. After the defer period and the quantity of idle slots, a channel occupancy time (COT) may allow gNB or UE transmissions. The COT may be less than a maximum COT time based at least in part on a priority class.

As shown by reference number 304, a Type2A channel sensing procedure may involve a fixed sensing time of 25 µs, with two sensing slots within the 25 µs. A basic channel sensing unit may be a sensing slot of 9 µs.

As shown by reference number 306, a Type2B channel sensing procedure may involve a fixed sensing time of 16 µs, with two one sensing slot within the 16 µs.

As indicated above, FIG. 3 is provided as an example. Other examples may differ from what is described with regard to FIG. 3.

New Radio Unlicensed (NR-U) at the 60 GHz band may support NR from 52.6 GHz to 71 GHz. NR-U at the 60 GHz band may support various unlicensed channel access modes, such as no LBT, conditional no-LBT, energy-detection based LBT, message-based LBT, and/or Rx-assisted LBT.

Figure 4:
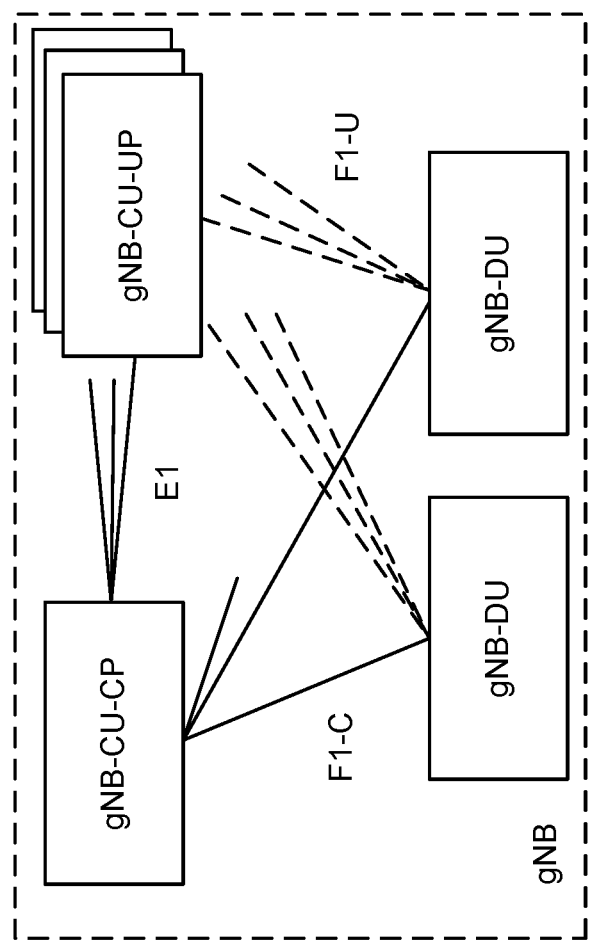
FIG. 4 is a diagram illustrating an example of a separation of a gNB control unit control plane (gNB-CU-CP) and a gNB control unit user plane (gNB-CU-UP), in accordance with the present disclosure.

FIG. 4 is a diagram illustrating an example 400 of a separation of a gNB-CU-CP and a gNB-CU-UP, in accordance with the present disclosure.

As shown in FIG. 4, a gNB may be associated with a gNB-CU-CP, one or more gNB-CU-UPs, and one or more gNB distributed units (DUs). The gNB-CU-CP may be a logical node hosting a control plane portion of a packet data convergence protocol (PDCP) protocol of a gNB-CU. A gNB-CU-UP may be a logical node hosting a user plane portion of the PDCP protocol of the gNB-CU. The gNB-CU-CP may be connected to a gNB-DU via an F1-C interface. The gNB-CU-UP may be connected to a gNB-DU via an F1-U interface. The gNB-CU-UP may be connected to the gNB-CU-CP via an E1 interface.

In some examples, one gNB-DU may be connected to only one gNB-CU-CP. One gNB-CU-UP may be connected to only one gNB-CU-CP. One gNB-DU may be connected to multiple gNB-CU-UPs under the control of a same gNB-CU-CP. One gNB-CU-UP may be connected to multiple DUs under the control of the same gNB-CU-CP.

As indicated above, FIG. 4 is provided as an example. Other examples may differ from what is described with regard to FIG. 4.

Figure 5:
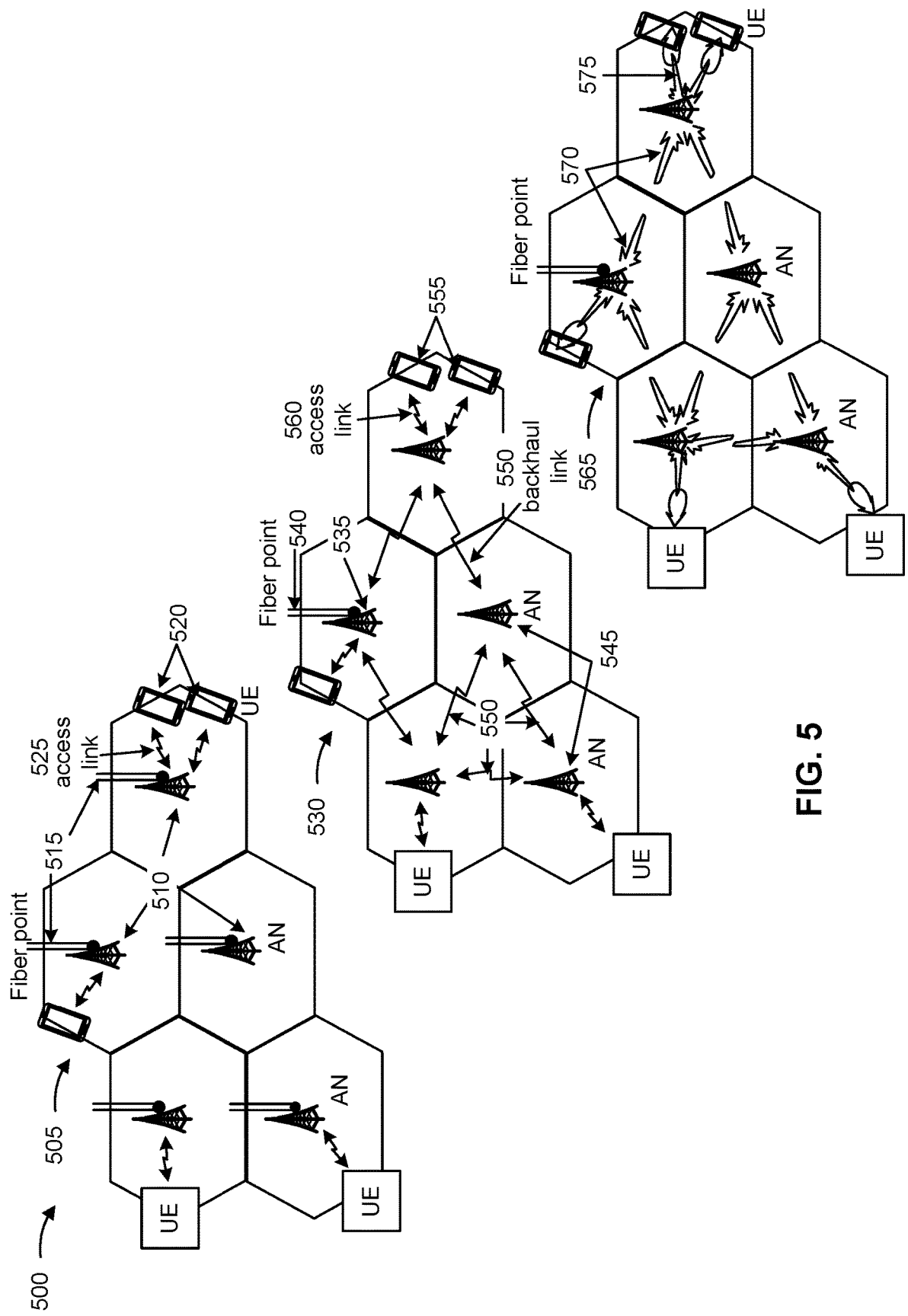
FIG. 5 is a diagram illustrating examples of radio access networks, in accordance with the present disclosure.

FIG. 5 is a diagram illustrating examples 500 of radio access networks, in accordance with the present disclosure.

As shown by reference number 505, a traditional (e.g., 3G, 4G, or LTE) radio access network may include multiple base stations 510 (e.g., access nodes (AN)), where each base station 510 communicates with a core network via a wired backhaul link 515, such as a fiber connection. A base station 510 may communicate with a UE 520 via an access link 525, which may be a wireless link. In some aspects, a base station 510 shown in FIG. 5 may be a base station 110 shown in FIG. 1. In some aspects, a UE 520 shown in FIG. 5 may be a UE 120 shown in FIG. 1.

As shown by reference number 530, a radio access network may include a wireless backhaul network, sometimes referred to as an integrated access and backhaul (IAB) network. In an IAB network, at least one base station is an anchor base station 535 that communicates with a core network via a wired backhaul link 540, such as a fiber connection. An anchor base station 535 may also be referred to as an IAB donor (or IAB-donor). The IAB network may include one or more non-anchor base stations 545, sometimes referred to as relay base stations or IAB nodes (or IAB-nodes). The non-anchor base station 545 may communicate directly or indirectly with the anchor base station 535 via one or more backhaul links 550 (e.g., via one or more non-anchor base stations 545) to form a backhaul path to the core network for carrying backhaul traffic. Backhaul link 550 may be a wireless link. Anchor base station(s) 535 and/or non-anchor base station(s) 545 may communicate with one or more UEs 555 via access links 560, which may be wireless links for carrying access traffic. In some aspects, an anchor base station 535 and/or a non-anchor base station 545 shown in FIG. 5 may be a base station 110 shown in FIG. 1. In some aspects, a UE 555 shown in FIG. 5 may be a UE 120 shown in FIG. 1.

As shown by reference number 565, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 570 between base stations may use millimeter wave signals to carry information and/or may be directed toward a target base station using beamforming. Similarly, the wireless access links 575 between a UE and a base station may use millimeter wave signals and/or may be directed toward a target wireless node (e.g., a UE and/or a base station). In this way, inter-link interference may be reduced.

The configuration of base stations and UEs in FIG. 5 is shown as an example, and other examples are contemplated. For example, one or more base stations illustrated in FIG. 5 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

As indicated above, FIG. 5 is provided as an example. Other examples may differ from what is described with regard to FIG. 5.

Figure 6:
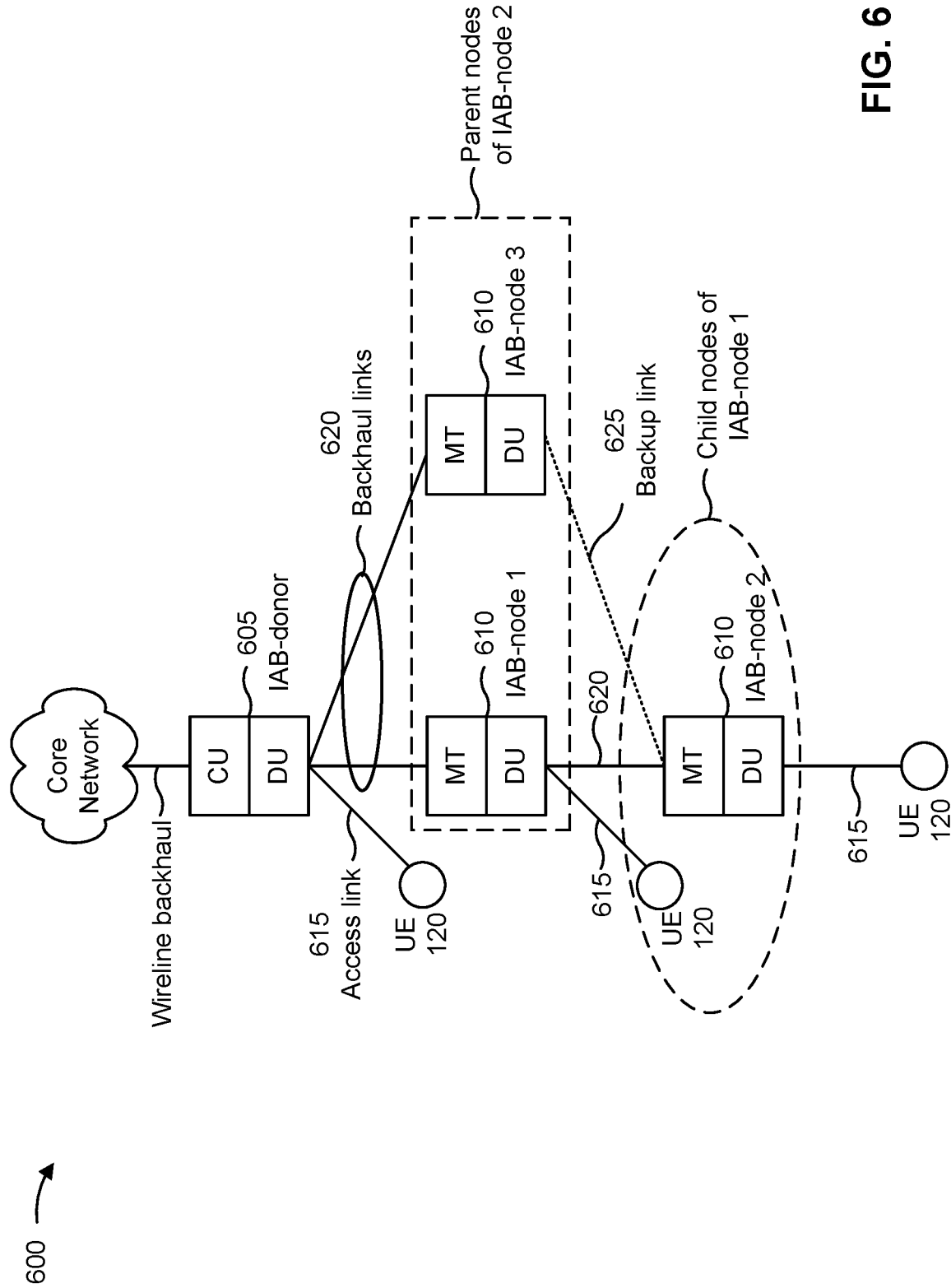
FIG. 6 is a diagram illustrating an example of an integrated access and backhaul (IAB) network architecture that supports unlicensed bands, in accordance with the disclosure.

FIG. 6 is a diagram illustrating an example 600 of an IAB network architecture that supports unlicensed bands, in accordance with the disclosure.

As shown in FIG. 6, an IAB network that supports unlicensed bands may include an IAB donor 605 (shown as IAB-donor) that connects to a core network via a wired connection (shown as a wireline backhaul). For example, an Ng interface of an IAB donor 605 may terminate at a core network. Additionally, or alternatively, an IAB donor 605 may connect to one or more devices of the core network that provide a core access and mobility management function (e.g., AMF). In some aspects, an IAB donor 605 may include a base station 110, such as an anchor base station. As shown, an IAB donor 605 may include a central unit (CU), which may perform access node controller (ANC) functions and/or AMF functions. The CU may configure a distributed unit (DU) of the IAB donor 605 and/or may configure one or more IAB nodes 610 (e.g., a mobile termination (MT) and/or a DU of an IAB node 610) that connect to the core network via the IAB donor 605. Thus, a CU of an IAB donor 605 may control and/or configure the entire IAB network that connects to the core network via the IAB donor 605, such as by using control messages and/or configuration messages (e.g., a radio resource control (RRC) configuration message or an F1 application protocol (FLAP) message).

As further shown in FIG. 6, the IAB network may include IAB nodes 610 (shown as IAB-node 1, IAB-node 2, and IAB-node 3) that connect to the core network via the IAB donor 605. As shown, an IAB node 610 may include MT functions (also sometimes referred to as UE functions (UEF)) and may include DU functions (also sometimes referred to as access node functions (ANF)). The MT functions of an IAB node 610 (e.g., a child node) may be controlled and/or scheduled by another IAB node 610 (e.g., a parent node of the child node) and/or by an IAB donor 605. The DU functions of an IAB node 610 (e.g., a parent node) may control and/or schedule other IAB nodes 610 (e.g., child nodes of the parent node) and/or UEs 120. Thus, a DU may be referred to as a scheduling node or a scheduling component, and an MT may be referred to as a scheduled node or a scheduled component. In some aspects, an IAB donor 605 may include DU functions and not MT functions. That is, an IAB donor 605 may configure, control, and/or schedule communications of IAB nodes 610 and/or UEs 120. A UE 120 may include only MT functions, and not DU functions. That is, communications of a UE 120 may be controlled and/or scheduled by an IAB donor 605 and/or an IAB node 610 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 605 or an IAB node 610, and a child node may be an IAB node 610 or a UE 120. Communications of an MT function of a child node may be controlled and/or scheduled by a parent node of the child node.

As further shown in FIG. 6, a link between a UE 120 (e.g., which only has MT functions, and not DU functions) and an IAB donor 605, or between a UE 120 and an IAB node 610, may be referred to as an access link 615. Access link 615 may be a wireless access link that provides a UE 120 with radio access to a core network via an IAB donor 605, and optionally via one or more IAB nodes 610. Thus, the network illustrated in FIG. 6 may be referred to as a multi-hop network or a wireless multi-hop network.

As further shown in FIG. 6, a link between an IAB donor 605 and an IAB node 610 or between two IAB nodes 610 may be referred to as a backhaul link 620. Backhaul link 620 may be a wireless backhaul link that provides an IAB node 610 with radio access to a core network via an IAB donor 605, and optionally via one or more other IAB nodes 610. In an IAB network, network resources for wireless communications (e.g., time resources, frequency resources, and/or spatial resources) may be shared between access links 615 and backhaul links 620. In some aspects, a backhaul link 620 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 625 between IAB-node 2 and IAB-node 3 may be used for backhaul communications if a primary backhaul link between IAB-node 2 and IAB-node 1 fails. As used herein, "node" or "wireless node" may refer to an IAB donor 605 or an IAB node 610.

As indicated above, FIG. 6 is provided as an example. Other examples may differ from what is described with regard to FIG. 6.

Figure 7:
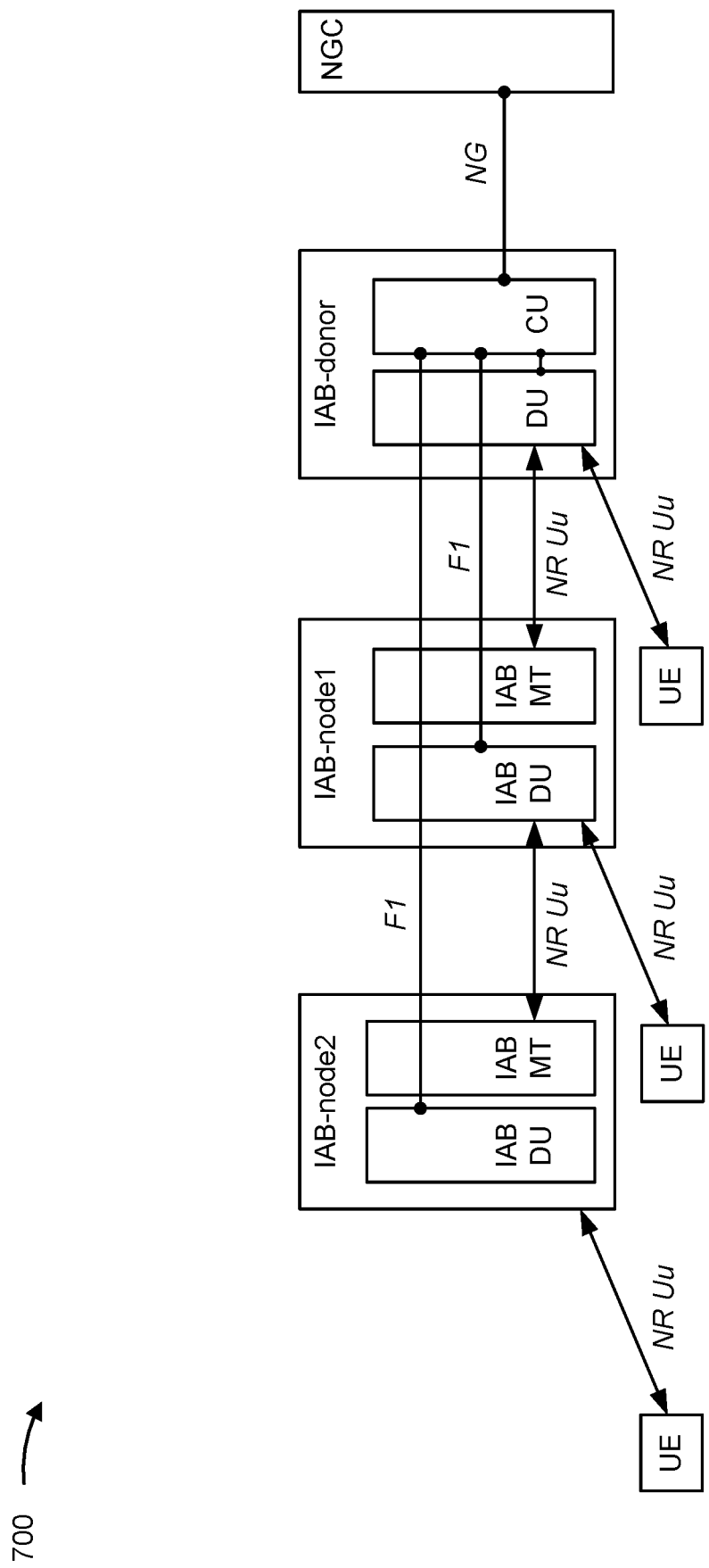
FIG. 7 is a diagram illustrating an example of IAB interfaces, in accordance with the disclosure.

FIG. 7 is a diagram illustrating an example 700 of IAB interfaces, in accordance with the disclosure.

As shown in FIG. 7, an IAB donor may be associated with an IAB donor DU and an IAB donor CU. The IAB donor CU may be a central node for IAB topology, and route and resource management. The IAB donor CU may communicate with a Next Generation Core (NGC) via a Next Generation (NG) interface. The IAB donor CU may communicate with the IAB donor DU. The IAB donor CU may communicate with an IAB DU of a first IAB node via an F1 interface. The IAB donor CU may communicate with an IAB DU of a second IAB node via an F1 interface. The IAB donor DU may communicate with an IAB MT of the first IAB node via an NR Uu interface. An IAB DU of the first IAB node may communicate with an IAB MT of the second IAB node via an NR Uu interface. Further, the IAB donor DU may communicate with a first UE, the IAB DU of the first IAB may communicate with a second UE, and an IAB DU of the second IAB may communicate with a third UE. A semi-static resource pattern (e.g., hard, soft, or not available (NA) and downlink, uplink, or flexible) for each IAB node DU may be configured by the IAB donor CU via F1-AP signaling. Further, a routing table at each IAB node may be configured by the IAB donor CU.

As indicated above, FIG. 7 is provided as an example. Other examples may differ from what is described with regard to FIG. 7.

Figure 8:
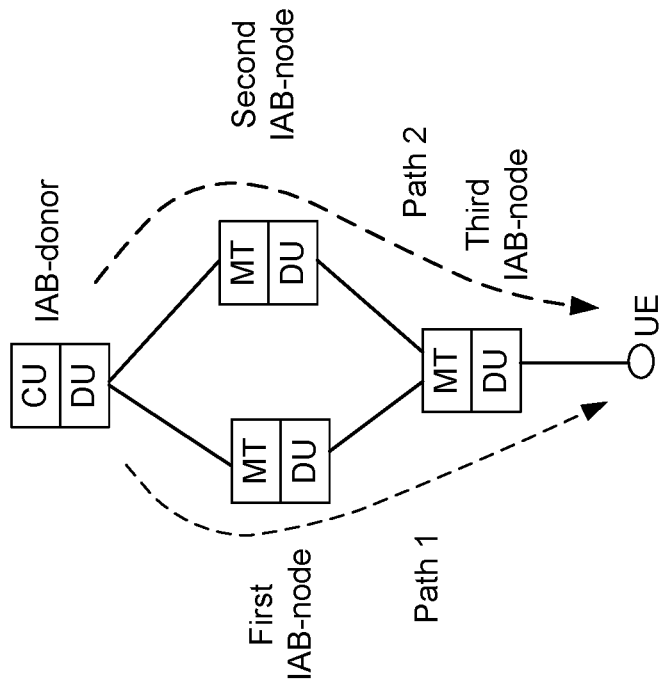
FIG. 8 is a diagram illustrating an example of a topology redundancy in an IAB network, in accordance with the disclosure.

FIG. 8 is a diagram illustrating an example 800 of a topology redundancy in an IAB network, in accordance with the disclosure.

As shown in FIG. 8, an IAB donor may communicate with a UE via a first IAB node and a third IAB node. The IAB donor may communicate with the UE via the first IAB node and the third IAB node based at least in part on a first path. Alternatively, or additionally, the IAB donor may communicate with the UE via a second IAB node and the third IAB node. The IAB donor may communicate with the UE via the second IAB node and the third IAB node based at least in part on a second path. In this example, an IAB topology may involve redundancy, as the IAB donor may communicate with the UE via the first path and/or via the second path.

As indicated above, FIG. 8 is provided as an example. Other examples may differ from what is described with regard to FIG. 8.

In an access network, a gNB-CU may control a quantity of gNB-DUs and access UEs. The gNB-CU may also be expected to control a quantity of repeaters, radio units (RUs), relays, and/or TRPs connected via a gNB-DU, and a gNB-DU may perform local management for the quantity of repeaters, RUs, relays, and/or TRPs.

In an IAB network, an IAB donor CU may be a central control node for IAB nodes in the IAB network, and a parent IAB node may also perform local management for child nodes of the parent IAB node. For example, the parent IAB node may perform resource management of soft resources associated with the child nodes.

A wireless node may report, to a control node in the network, an indication of a status of the wireless node with respect to an unlicensed channel access. The control node may adjust, based at least in part on the indication of the status, a configuration and management for the network and improve a performance of the unlicensed channel access. For example, the control node may select LBT modes or parameters for one or more wireless nodes in the network. The control node may adjust a topology and/or a routing table to avoid wireless nodes with persistent LBT failure. The control node may adjust a resource configuration to increase an LBT success rate for the wireless nodes with the persistent LBT failure.

A wireless node, such as a WiFi access terminal (AT), may report to a network application server an indication of a status of the wireless node. The wireless node may report, to the network application server, the indication of the status via a generic Internet Protocol (IP) connection. The network application server may manage a quantity of nodes in an area associated with a WiFi AP.

Channel access procedures, such as LBT, may be performed for unlicensed bands. A node, such as a base station or UE, may only be allowed to transmit based at least in part on passing the channel access procedure. However, in some cases, channel access procedures for the unlicensed band may use LBT modes or parameters that lead to persistent LBT failure (e.g., a rate of LBT failure that satisfies a threshold). Further, the channel access procedures for the unlicensed band may use resource configurations that lead to persistent LBT failure.

In various aspects of techniques and apparatuses described herein, a control node may receive, from a wireless node, a status report of an unlicensed band associated with an unlicensed channel access of the wireless node. The status report may indicate LBT failures during the unlicensed channel access of the wireless node. In some aspects, the status report may indicate actual failure events and/or virtual failure events. In some aspects, the status report may indicate statistics associated with the LBT failures, such as an LBT success rate, an LBT failure rate, a pattern of LBT failure in a time domain, in a frequency domain, or in a spatial domain, or an average quantity of sensing slots to pass LBT. In some aspects, the control node may transmit, to the wireless node, an updated configuration for unlicensed channel access based at least in part on the status report of the unlicensed band. In some aspects, the updated configuration may indicate an updated channel access mode, an updated LBT mode, updated channel access parameters, and/or adjusted channel sensing parameters based at least in part on the status report. In some aspects, the updated configuration may indicate an updated resource configuration to reduce a rate of the LBT failures. The updated resource configuration may indicate resources in a time domain, a frequency domain, and/or a spatial domain, and the updated resource configuration may indicate transmit powers or MCS values associated with the resources.

Figure 9:
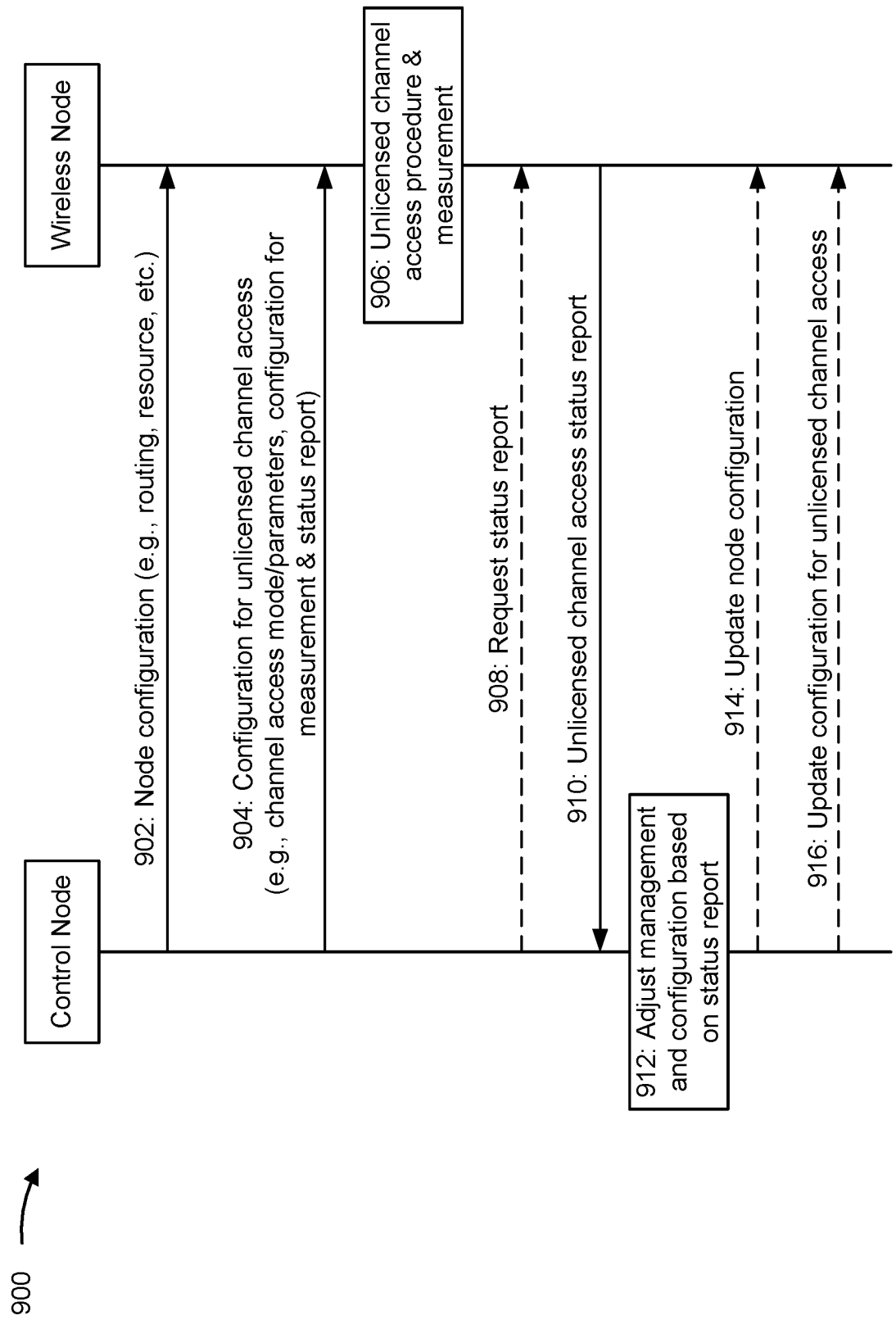
FIG. 9 is a diagram illustrating an example associated with updating configurations for unlicensed channel access using status reports of an unlicensed band, in accordance with the present disclosure.

FIG. 9 is a diagram illustrating an example 900 associated with updating configurations for unlicensed channel access using status reports of an unlicensed band, in accordance with the present disclosure. As shown in FIG. 9, example 900 includes communication between a control node and a wireless node. In some aspects, the control node and the wireless node may be included in a wireless network such as wireless network 100.

In some aspects, the control node may be a gNB-CU in an access network, and the wireless node may be a gNB-DU, an access UE, a repeater, or a TRP in the access network. In some aspects, the control node may be a gNB-DU in an access network, and the control node may be a repeater, an RU, a TRP, or an access UE in the access network. In some aspects, the control node may be an IAB donor CU in an IAB network, and the wireless node may be an IAB node, an access UE, a repeater, or a TRP in the IAB network. In some aspects, the control node may be a first IAB node in an IAB network, and the wireless node may be a second IAB node in the IAB network. For example, the first IAB node may be a parent of the second IAB node, the first IAB node may be a child of the second IAB node, or the first IAB node and the second IAB node may have a PC5 sidelink connection. In some aspects, the control node may be an application server in a WiFi network, and the wireless node may be a WiFi AP or AT in the WiFi network.

As shown by reference number 902, the control node may transmit, to the wireless node, a node configuration. The node configuration may be associated with routing, resources, etc. for the wireless node.

As shown by reference number 904, the control node may transmit, to the wireless node, a configuration for an unlicensed channel access. The configuration may indicate channel access modes and/or parameters. The configuration may indicate a configuration for measurement and status reports.

As shown by reference number 906, the wireless node may perform an unlicensed channel access procedure and measurement based at least in part on the configuration for the unlicensed channel access.

As shown by reference number 908, the control node may transmit, to the wireless node, a request for a status report. In other words, the control node may request the status report from the wireless node. The status report may be associated with the unlicensed channel access performed by the wireless node.

As shown by reference number 910, the control node may receive, from the wireless node, the status report associated with the unlicensed channel access. In other words, the control node may receive the status report for the unlicensed channel access from the wireless node. The wireless node may transmit the status report based at least in part on the request received from the control node.

In some aspects, the status report may include an indication of consistent LBT failure (e.g., a quantity of LBT failures that satisfy a threshold over a duration of time). The LBT failure may be an actual failure event for a desired or expected transmission at a detecting node. In some aspects, the status report may include an early indication of consistent (e.g., virtual) LBT failure, where channel sensing may be performed for a pretended transmission. One or more detection thresholds may be configured for channel sensing of the virtual transmission. In some aspects, the status report may include information or statistics for LBT, such as a success or failure rate, a pattern of failure in a time-frequency-spatial domain, and/or an average quantity of sensing slots to pass LBT. In some aspects, the status report may include information on channel sensing measurements, such as averaged or filtered measurement results and/or statistics associated with the measurement results. In some aspects, the status report may include an indication of an unexpected high communication failure during a channel occupancy after LBT.

In some aspects, the wireless node may include multiple entities. In this case, the status report may be a single status report for a plurality of entities of the wireless node. Alternatively, the status report may include separate status reports for different entities of the wireless node. For example, multiple entities of the wireless node may include an MT and DU in an IAB node, different carriers or cells or beams of a wireless node, or different carriers or sectors or TRPs or Rus or repeaters of a gNB-DU.

In some aspects, the wireless node may be triggered to transmit the status report based at least in part on the request from the control node. In some aspects, the wireless node may be triggered to transmit the status report based at least in part on triggering conditions that are (pre)configured for the wireless node (e.g., triggering conditions configured by the control node). For example, the wireless node may transmit the status report based at least in part on a periodic reporting, or the wireless node may transmit the status report based at least in part on an aperiodic triggering by an event (e.g., LBT or a communication failure event).

In some aspects, the control node may forward the status report to another control node or a peer node. For example, in a 5G NR network, one CU may forward a received status report to another CU. In an IAB network, the CU may be an IAB donor CU. As another example, in a 5G NR network, a gNB-DU may receive a status report from an access UE via a medium access control control element (MAC-CE) or uplink control information (UCI), and the gNB-DU may generate a status report to be sent to the CU.

In some aspects, the wireless node may generate the status report based at least in part on a channel sensing. The channel sensing may be for intended transmissions (e.g., transmissions via an allocation or scheduling), or the channel sensing may be for pretended transmissions (e.g., virtual LBT) for the purpose of generating the status report. The pretended transmissions may be configured by a CU for periodic virtual attempts or after a timer expires after a last actual LBT.

As shown by reference number 912, the control node may adjust a management and/or configuration for the wireless node based at least in part on the status report. For example, the control node may adjust the management and/or configuration for the wireless node based at least in part on the indication of consistent LBT failure, the indication of consistent virtual LBT failure, statistics for LBT, information on channel sensing measurements, etc., as indicated in the status report. The control node may determine an updated configuration for unlicensed channel access for the wireless node, based at least in part on the status report.

As shown by reference number 914, the control node may transmit, to the wireless node, an updated node configuration. The updated node configuration may be associated with updated routing, updated resources, etc. for the wireless node. In some aspects, the control node may transmit the updated node configuration to the wireless node and/or other wireless nodes in the wireless network.

As shown by reference number 916, the control node may transmit, to the wireless node, the updated configuration for unlicensed channel access for the wireless node. The updated configuration for unlicensed channel access for the wireless node may be based at least in part on an adjustment, made by the control node, to the management and/or configuration and/or parameters for the wireless node based at least in part on the status report. In other words, the control node may transmit the updated configuration for unlicensed channel access for the wireless node based at least in part on the status report received from the wireless node. In some aspects, the control node may transmit the updated configuration for unlicensed channel access to the wireless node and/or other wireless nodes in the wireless network.

In some aspects, the control node may transmit the updated configuration for unlicensed channel access to update an existing LBT mode to a different LBT mode. For example, when the wireless node has a relatively high LBT failure or communication failure after LBT, the different LBT mode may be a more advanced LBT mode, such as a message-based LBT mode or an RX-assisted LBT mode. As another example, when the wireless node has no or infrequent LBT failure, the different LBT mode may be a no-LBT mode or a conditional no-LBT mode.

In some aspects, the control node may transmit the updated configuration for unlicensed channel access to adjust channel sensing parameters, such as an energy detection threshold and/or a periodicity of a frame-based LBT. As an example, the adjusted channel sensing parameters may serve to lower the energy detection threshold for a wireless node with a relatively high communication failure after LBT. As another example, the adjusted channel sensing parameters may serve to increase the energy detection threshold for a wireless node with no or infrequent LBT failure.

In some aspects, the control node may transmit the updated configuration for unlicensed channel access to update a configuration for status reporting. For example, the updated configuration may adjust a triggering condition or a frequency of status reports. The updated configuration may include a request to include additional information in subsequent status reports.

In some aspects, the control node may transmit an updated resource configuration to the wireless node. The updated resource configuration may serve to minimize or reduce a potential LBT failure rate. The updated resource configuration may be associated with resources in a time domain, frequency domain, spatial domain, transmit power domain, and/or code domain (e.g., based at least in part on MCS values). In some aspects, the updated resource configuration may update a semi-static resource allocation for a control channel and/or a semi-persistent scheduling (SPS) or configured grant data transmission to avoid resources with a relatively high LBT failure. In some aspects, the updated resource configuration may impose scheduling constraints for upcoming transmissions, such as constraints on transmit power, MCS values, time-frequency resources, and/or a set of transmit beams. In some aspects, the updated resource configuration may reconfigure a primary cell (PCell) or secondary cells (SCells). For example, a carrier with a relatively low LBT failure rate may be reconfigured to be the PCell. In some aspects, the updated resource configuration may update hard/soft/NA resource patterns among IAB nodes in an IAB network. For example, the updated resource configuration may configure more frequent switching of hard/soft/NA resource for an IAB node with more frequent LBT failure. As another example, unavailable resources may be aligned with an LBT failure pattern in a time, frequency, and/or spatial domain.

In some aspects, the control node may transmit, to the wireless node, an updated configuration for a topology and/or routing table (e.g., in an IAB network or other multi-hop relay networks) to minimize or reduce a potential LBT failure rate. For example, the updated configuration may adjust the topology and/or routing table to avoid a wireless node with consistent LBT failure. As another example, the updated configuration may add redundant paths in the network due to consistent LBT failures at some wireless nodes in the network.

In some aspects, signaling between the control node and the wireless node may be associated with carrying the configuration for the unlicensed channel access, the request for the status report, the status report associated with the unlicensed channel access, and/or the updated configuration for the unlicensed channel access. In some aspects, the signaling may be conveyed over an unlicensed band or a licensed band between the control node and the wireless node.

In some aspects, the signaling may be carried by an F1-AP interface between a DU and a CU. In some aspects, the signaling may be carried by an RRC interface between an IAB-MT or UE and a CU. In some aspects, the signaling may be carried by a MAC-CE or downlink control information (DCI) or UCI between a DU and a UE/MT. In some aspects, the signaling may be carried by a PC5 sidelink between UEs. In some aspects, the signaling may be carried by an IP connection between a wireless node and a control node. In some aspects, the signaling may be carried by a WiFi link between WiFi nodes. In some aspects, the signaling may be carried by another interface between a wireless node and a control node.

As indicated above, FIG. 9 is provided as an example. Other examples may differ from what is described with regard to FIG. 9.

Figure 10:
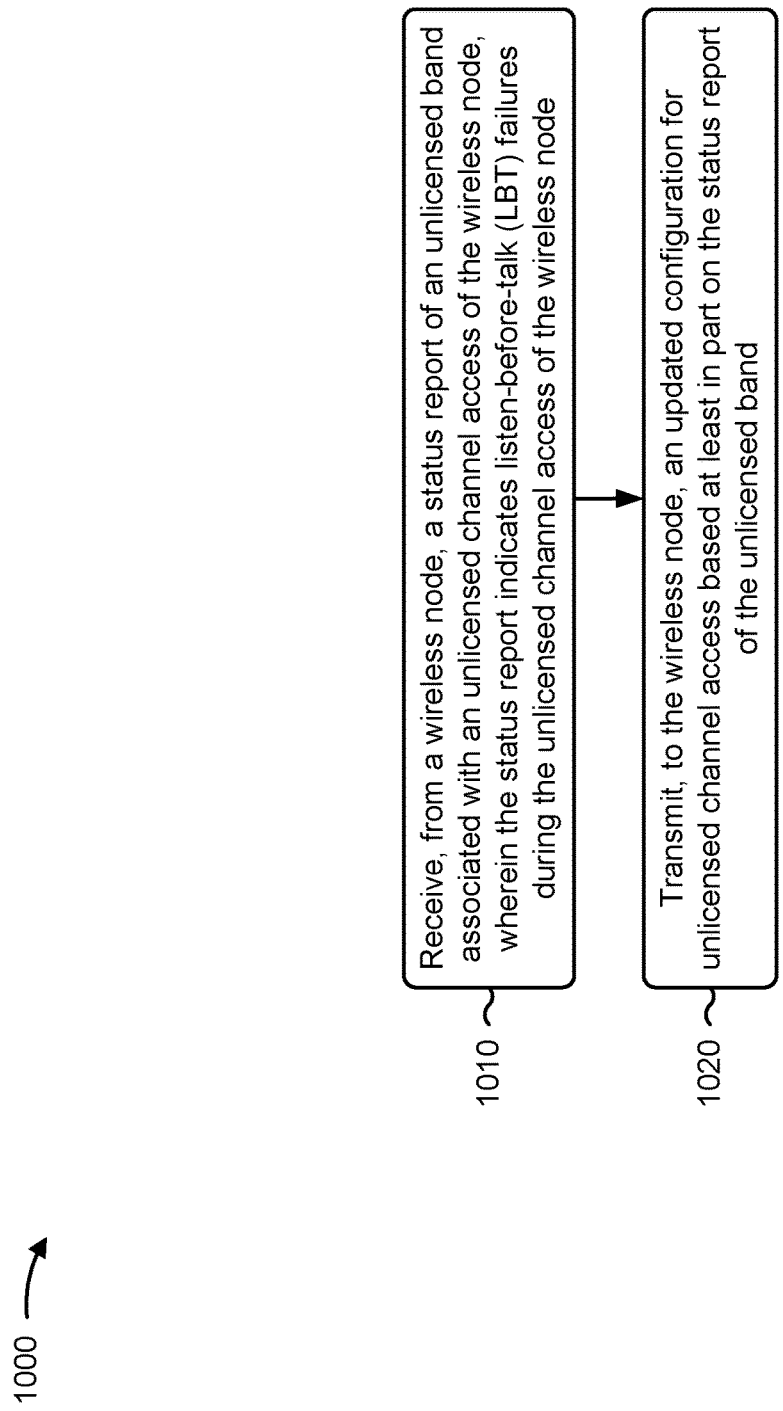
FIGS. 10-11 are diagrams illustrating example processes associated with updating configurations for unlicensed channel access using status reports of an unlicensed band, in accordance with the present disclosure.

FIG. 10 is a diagram illustrating an example process 1000 performed, for example, by a control node, in accordance with the present disclosure. Example process 1000 is an example where the control node performs operations associated with updating configurations for unlicensed channel access using status reports of an unlicensed band.

As shown in FIG. 10, in some aspects, process 1000 may include receiving, from a wireless node, a status report of an unlicensed band associated with an unlicensed channel access of the wireless node, wherein the status report indicates LBT failures during the unlicensed channel access of the wireless node (block 1010). For example, the control node (e.g., using reception component 1202, depicted in FIG. 12) may receive, from a wireless node, a status report of an unlicensed band associated with an unlicensed channel access of the wireless node, wherein the status report indicates LBT failures during the unlicensed channel access of the wireless node, as described above in connection with FIG. 9.

As further shown in FIG. 10, in some aspects, process 1000 may include transmitting, to the wireless node, an updated configuration for unlicensed channel access based at least in part on the status report of the unlicensed band (block 1020). For example, the control node (e.g., using transmission component 1204, depicted in FIG. 12) may transmit, to the wireless node, an updated configuration for unlicensed channel access based at least in part on the status report of the unlicensed band, as described above in connection with FIG. 9.

Process 1000 may include additional aspects, such as any single aspect or any combination of aspects described below and/or in connection with one or more other processes described elsewhere herein.

In a first aspect, process 1000 includes transmitting, to the wireless node, a configuration for unlicensed channel access, wherein the configuration indicates one or more of channel access modes, channel access parameters, a measurement configuration, or a status report configuration.

In a second aspect, alone or in combination with the first aspect, the status report indicating the LBT failures indicates actual failure events, wherein the actual failure events are associated with expected transmissions.

In a third aspect, alone or in combination with one or more of the first and second aspects, the status report indicating the LBT failures includes virtual failure events, wherein the virtual failure events are associated with virtual transmissions, and one or more detection thresholds are configured for channel sensing of the virtual transmissions.

In a fourth aspect, alone or in combination with one or more of the first through third aspects, the status report indicates statistics associated with the LBT failures, wherein the statistics indicate one or more of an LBT success rate, an LBT failure rate, a pattern of LBT failure in a time domain, in a frequency domain, or in a spatial domain, or an average quantity of sensing slots to pass LBT.

In a fifth aspect, alone or in combination with one or more of the first through fourth aspects, the status report indicates information associated with channel sensing measurements, wherein the information indicates averaged or filtered measurement results or statistics associated with the measurement results.

In a sixth aspect, alone or in combination with one or more of the first through fifth aspects, the status report indicates communication failures during a channel occupancy after an LBT.

In a seventh aspect, alone or in combination with one or more of the first through sixth aspects, process 1000 includes transmitting, to the wireless node, a request for the status report, wherein the status report is received from the wireless node based at least in part on the request for the status report.

In an eighth aspect, alone or in combination with one or more of the first through seventh aspects, process 1000 includes transmitting, to the wireless node, a configuration that configures a triggering condition for the wireless node to transmit the status report to the control node, wherein the triggering condition is associated with a periodic reporting of the status report or an aperiodic reporting of the status report due to an event occurrence.

In a ninth aspect, alone or in combination with one or more of the first through eighth aspects, the control node is a first control node, and process 1000 includes transmitting the status report to a second control node or a peer node.

In a tenth aspect, alone or in combination with one or more of the first through ninth aspects, the updated configuration for unlicensed channel access indicates an updated channel access mode or an updated LBT mode based at least in part on the status report, wherein the updated LBT mode includes one or more of a message-based LBT mode, a receiver-assisted LBT mode, a no-LBT mode, or a conditional no-LBT mode.

In an eleventh aspect, alone or in combination with one or more of the first through tenth aspects, the updated configuration for unlicensed channel access indicates updated channel access parameters or adjusted channel sensing parameters based at least in part on the status report, wherein the adjusted channel sensing parameters indicate an energy detection threshold or a periodicity for a frame-based LBT mode.

In a twelfth aspect, alone or in combination with one or more of the first through eleventh aspects, the updated configuration for unlicensed channel access indicates an updated status report configuration based at least in part on the status report, wherein the updated status report configuration indicates one or more of a triggering condition, a frequency of status reporting, or an indication to include additional information in a subsequent status report.

In a thirteenth aspect, alone or in combination with one or more of the first through twelfth aspects, the updated configuration for unlicensed channel access indicates an updated resource configuration to reduce a rate of the LBT failures, wherein the updated resource configuration indicates resources in one or more of a time domain, a frequency domain, or a spatial domain, and the updated resource configuration indicates transmit powers or modulation and coding scheme values associated with the resources.

In a fourteenth aspect, alone or in combination with one or more of the first through thirteenth aspects, the updated configuration for unlicensed channel access indicates one or more of an updated semi-static resource allocation for a control channel to avoid resources with an LBT failure rate that satisfies a threshold, or an updated semi-static resource allocation for a semi-persistent scheduled or configured grant data transmission to avoid resources with the LBT failure rate that satisfies the threshold.

In a fifteenth aspect, alone or in combination with one or more of the first through fourteenth aspects, the updated configuration for unlicensed channel access indicates scheduling constraints for upcoming transmissions, wherein the scheduling constraints are associated with a transmit power, modulation and coding scheme values, time-frequency resources, or a set of transmit beams.

In a sixteenth aspect, alone or in combination with one or more of the first through fifteenth aspects, the updated configuration for unlicensed channel access indicates a change to a primary cell or to one or more secondary cells, wherein the primary cell is associated with an LBT success rate that satisfies a threshold.

In a seventeenth aspect, alone or in combination with one or more of the first through sixteenth aspects, the updated configuration for unlicensed channel access indicates an updated resource pattern, wherein unavailable resources are aligned with an LBT failure pattern in a time domain, a frequency domain, and a spatial domain based at least in part on the updated resource pattern.

In an eighteenth aspect, alone or in combination with one or more of the first through seventeenth aspects, the updated configuration for unlicensed channel access indicates a topology or routing table to avoid nodes having an LBT failure rate that satisfies a threshold.

In a nineteenth aspect, alone or in combination with one or more of the first through eighteenth aspects, the updated configuration for unlicensed channel access indicates one or more redundant paths based at least in part on nodes having an LBT failure rate that satisfies a threshold.

In a twentieth aspect, alone or in combination with one or more of the first through nineteenth aspects, the wireless node is associated with multiple entities, and the status report is associated with the multiple entities associated with the wireless node.

In a twenty-first aspect, alone or in combination with one or more of the first through twentieth aspects, the wireless node is associated with multiple entities, and the status report includes separate status reports for each of the multiple entities associated with the wireless node.

In a twenty-second aspect, alone or in combination with one or more of the first through twenty-first aspects, the status report and the updated configuration for unlicensed channel access are carried via one or more of an F1-AP interface between the control node and the wireless node, a radio resource control interface between the control node and the wireless node, a MAC-CE, DCI, or UCI, a PC5 sidelink connection between the control node and the wireless node, an Internet Protocol connection between the control node and the wireless node, or a WiFi link between the control node and the wireless node.

In a twenty-third aspect, alone or in combination with one or more of the first through twenty-second aspects, the status report is received over an unlicensed band or a licensed band between the control node and the wireless node, and the updated configuration for unlicensed channel access is transmitted over the unlicensed band or the licensed band between the control node and the wireless node.

In a twenty-fourth aspect, alone or in combination with one or more of the first through twenty-third aspects, the control node is a gNB-CU in an access network, and the wireless node is a gNB-DU, an access user equipment, a repeater, or a transmit-receive point in the access network.

In a twenty-fifth aspect, alone or in combination with one or more of the first through twenty-fourth aspects, the control node is a gNB-DU in an access network, and the wireless node is a repeater, a radio unit, or a transmit-receive point in the access network.

In a twenty-sixth aspect, alone or in combination with one or more of the first through twenty-fifth aspects, the control node is an IAB-donor CU in an IAB network, and the wireless node is an IAB node, an access user equipment, a repeater, or a transmit-receive point in the IAB network.

In a twenty-seventh aspect, alone or in combination with one or more of the first through twenty-sixth aspects, the control node is a first IAB node in an IAB network, and the wireless node is a second IAB node in the IAB network, wherein the first IAB node is a parent of the second IAB node, the first IAB node is a child of the second IAB node, or the first IAB node and the second IAB node are connected via a PC5 sidelink connection.

In a twenty-eighth aspect, alone or in combination with one or more of the first through twenty-seventh aspects, the control node is an application server in a WiFi network, and the wireless node is a WiFi access point or an access terminal in the WiFi network.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
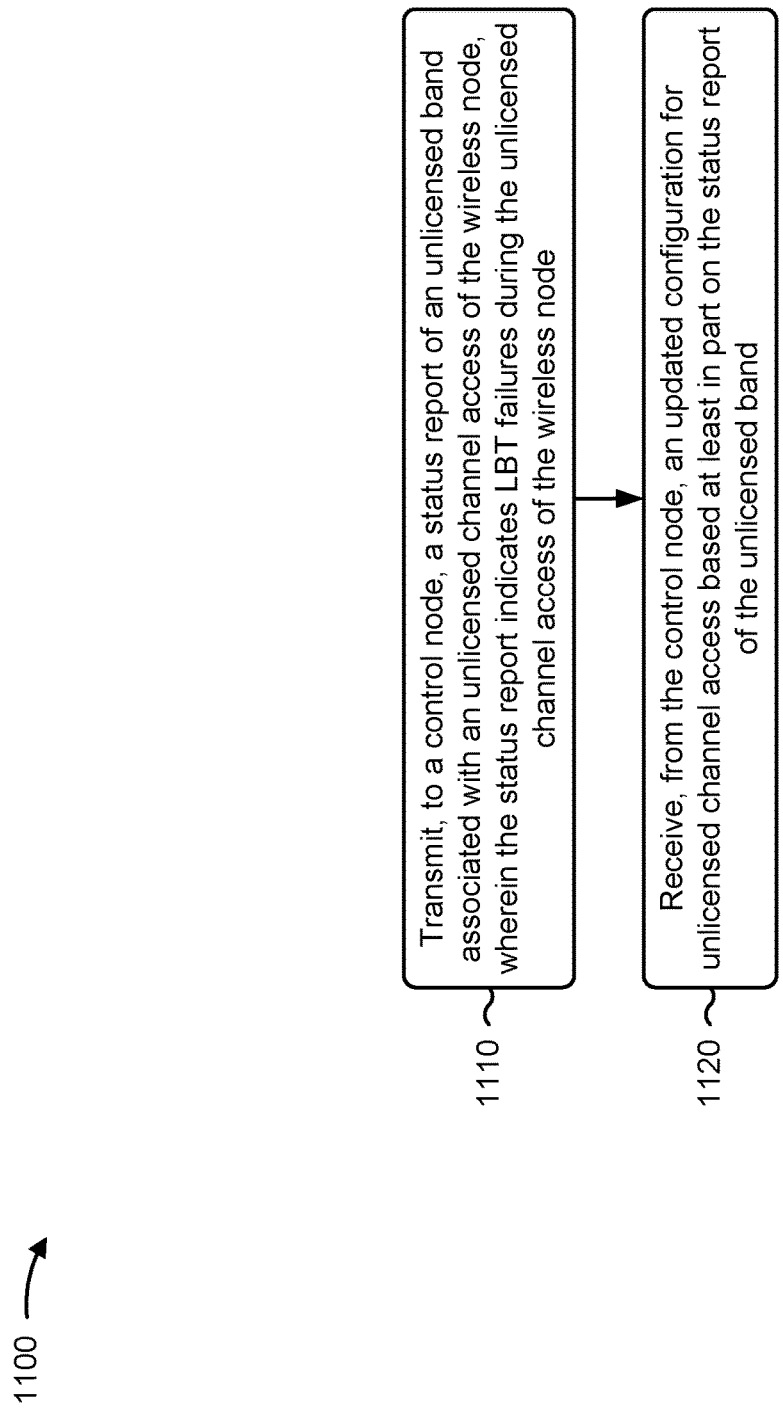

FIG. 11 is a diagram illustrating an example process 1100 performed, for example, by a wireless node, in accordance with the present disclosure. Example process 1100 is an example where the wireless node performs operations associated with updating configurations for unlicensed channel access using status reports of an unlicensed band.

As shown in FIG. 11, in some aspects, process 1100 may include transmitting, to a control node, a status report of an unlicensed band associated with an unlicensed channel access of the wireless node, wherein the status report indicates LBT failures during the unlicensed channel access of the wireless node (block 1110). For example, the wireless node (e.g., using transmission component 1304, depicted in FIG. 13) may transmit, to a control node, a status report of an unlicensed band associated with an unlicensed channel access of the wireless node, wherein the status report indicates LBT failures during the unlicensed channel access of the wireless node, as described above in connection with FIG. 9.

As further shown in FIG. 11, in some aspects, process 1100 may include receiving, from the control node, an updated configuration for unlicensed channel access based at least in part on the status report of the unlicensed band (block 1120). For example, the wireless node (e.g., using reception component 1202, depicted in FIG. 12) may receive, from the control node, an updated configuration for unlicensed channel access based at least in part on the status report of the unlicensed band, as described above in connection with FIG. 9.

Process 1100 may include additional aspects, such as any single aspect or any combination of aspects described below and/or in connection with one or more other processes described elsewhere herein.

In a first aspect, process 1100 includes receiving, from the control node, a configuration for unlicensed channel access, wherein the configuration indicates one or more of channel access modes, channel access parameters, a measurement configuration, or a status report configuration.

In a second aspect, alone or in combination with the first aspect, the status report indicating the LBT failures indicates actual failure events, wherein the actual failure events are associated with expected transmissions.

In a third aspect, alone or in combination with one or more of the first and second aspects, the status report indicating the LBT failures includes virtual failure events, wherein the virtual failure events are associated with virtual transmissions, and one or more detection thresholds are configured for channel sensing of the virtual transmissions.

In a fourth aspect, alone or in combination with one or more of the first through third aspects, the status report indicates statistics associated with the LBT failures, wherein the statistics indicate one or more of an LBT success rate, an LBT failure rate, a pattern of LBT failure in a time domain, in a frequency domain, or in a spatial domain, or an average quantity of sensing slots to pass LBT.

In a fifth aspect, alone or in combination with one or more of the first through fourth aspects, the status report indicates information associated with channel sensing measurements, wherein the information indicates averaged or filtered measurement results or statistics associated with the measurement results.

In a sixth aspect, alone or in combination with one or more of the first through fifth aspects, the status report indicates communication failures during a channel occupancy after an LBT.

In a seventh aspect, alone or in combination with one or more of the first through sixth aspects, process 1100 includes receiving, from the control node, a request for the status report, wherein the status report is received from the wireless node based at least in part on the request for the status report.

In an eighth aspect, alone or in combination with one or more of the first through seventh aspects, process 1100 includes receiving, from the control node, a configuration that configures a triggering condition for the wireless node to transmit the status report to the control node, wherein the triggering condition is associated with a periodic reporting of the status report or an aperiodic reporting of the status report due to an event occurrence.

In a ninth aspect, alone or in combination with one or more of the first through eighth aspects, process 1100 includes generating the status report based at least in part on a channel sensing for an intended transmission via an allocation or scheduling, or generating the status report based at least in part on a channel sensing for a virtual transmission for a purpose of generating the status report.

In a tenth aspect, alone or in combination with one or more of the first through ninth aspects, the updated configuration for unlicensed channel access indicates an updated channel access mode or an updated LBT mode based at least in part on the status report, wherein the updated LBT mode includes one or more of a message-based LBT mode, a receiver-assisted LBT mode, a no-LBT mode, or a conditional no-LBT mode.

In an eleventh aspect, alone or in combination with one or more of the first through tenth aspects, the updated configuration for unlicensed channel access indicates updated channel access parameters or adjusted channel sensing parameters based at least in part on the status report, wherein the adjusted channel sensing parameters indicate an energy detection threshold or a periodicity for a frame-based LBT mode.

In a twelfth aspect, alone or in combination with one or more of the first through eleventh aspects, the updated configuration for unlicensed channel access indicates an updated status report configuration based at least in part on the status report, wherein the updated status report configuration indicates one or more of a triggering condition, a frequency of status reporting, or an indication to include additional information in a subsequent status report.

In a thirteenth aspect, alone or in combination with one or more of the first through twelfth aspects, the updated configuration for unlicensed channel access indicates an updated resource configuration to reduce a rate of the LBT failures, wherein the updated resource configuration indicates resources in one or more of a time domain, a frequency domain, or a spatial domain, and the updated resource configuration indicates transmit powers or modulation and coding scheme values associated with the resources.

In a fourteenth aspect, alone or in combination with one or more of the first through thirteenth aspects, the updated configuration for unlicensed channel access indicates one or more of an updated semi-static resource allocation for a control channel to avoid resources with an LBT failure rate that satisfies a threshold, or an updated semi-static resource allocation for a semi-persistent scheduled or configured grant data transmission to avoid resources with the LBT failure rate that satisfies the threshold.

In a fifteenth aspect, alone or in combination with one or more of the first through fourteenth aspects, the updated configuration for unlicensed channel access indicates scheduling constraints for upcoming transmissions, wherein the scheduling constraints are associated with a transmit power, MCS values, time-frequency resources, or a set of transmit beams.

In a sixteenth aspect, alone or in combination with one or more of the first through fifteenth aspects, the updated configuration for unlicensed channel access indicates a change to a primary cell or to one or more secondary cells, wherein the primary cell is associated with an LBT success rate that satisfies a threshold.

In a seventeenth aspect, alone or in combination with one or more of the first through sixteenth aspects, the updated configuration for unlicensed channel access indicates an updated resource pattern, wherein unavailable resources are aligned with an LBT failure pattern in a time domain, a frequency domain, and a spatial domain based at least in part on the updated resource pattern.

In an eighteenth aspect, alone or in combination with one or more of the first through seventeenth aspects, the updated configuration for unlicensed channel access indicates a topology or routing table to avoid nodes having an LBT failure rate that satisfies a threshold.

In a nineteenth aspect, alone or in combination with one or more of the first through eighteenth aspects, the updated configuration for unlicensed channel access indicates one or more redundant paths based at least in part on nodes having an LBT failure rate that satisfies a threshold.

In a twentieth aspect, alone or in combination with one or more of the first through nineteenth aspects, the wireless node is associated with multiple entities, and the status report is associated with the multiple entities associated with the wireless node.

In a twenty-first aspect, alone or in combination with one or more of the first through twentieth aspects, the wireless node is associated with multiple entities, and the status report includes separate status reports for each of the multiple entities associated with the wireless node.

In a twenty-second aspect, alone or in combination with one or more of the first through twenty-first aspects, the status report and the updated configuration for unlicensed channel access are carried via one or more of an F1 access protocol interface between the control node and the wireless node, a radio resource control interface between the control node and the wireless node, a MAC-CE, DCI, or UCI, a PC5 sidelink connection between the control node and the wireless node, an Internet Protocol connection between the control node and the wireless node, or a WiFi link between the control node and the wireless node.

In a twenty-third aspect, alone or in combination with one or more of the first through twenty-second aspects, the status report is transmitted over an unlicensed band or a licensed band between the control node and the wireless node, and the updated configuration for unlicensed channel access is received over the unlicensed band or the licensed band between the control node and the wireless node.

In a twenty-fourth aspect, alone or in combination with one or more of the first through twenty-third aspects, the control node is a gNB-CU in an access network, and the wireless node is a gNB-DU, an access user equipment, a repeater, or a transmit-receive point in the access network.

In a twenty-fifth aspect, alone or in combination with one or more of the first through twenty-fourth aspects, the control node is a gNB-DU in an access network, and the wireless node is a repeater, a radio unit, or a transmit-receive point in the access network.

In a twenty-sixth aspect, alone or in combination with one or more of the first through twenty-fifth aspects, the control node is an IAB-donor CU in an IAB network, and the wireless node is an IAB node, an access user equipment, a repeater, or a transmit-receive point in the IAB network.

In a twenty-seventh aspect, alone or in combination with one or more of the first through twenty-sixth aspects, the control node is a first IAB node in an IAB network, and the wireless node is a second IAB node in the IAB network, wherein the first IAB node is a parent of the second IAB node, the first IAB node is a child of the second IAB node, or the first IAB node and the second IAB node are connected via a PC5 sidelink connection.

In a twenty-eighth aspect, alone or in combination with one or more of the first through twenty-seventh aspects, the control node is an application server in a WiFi network, and the wireless node is a WiFi access point or an access terminal in the WiFi network.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
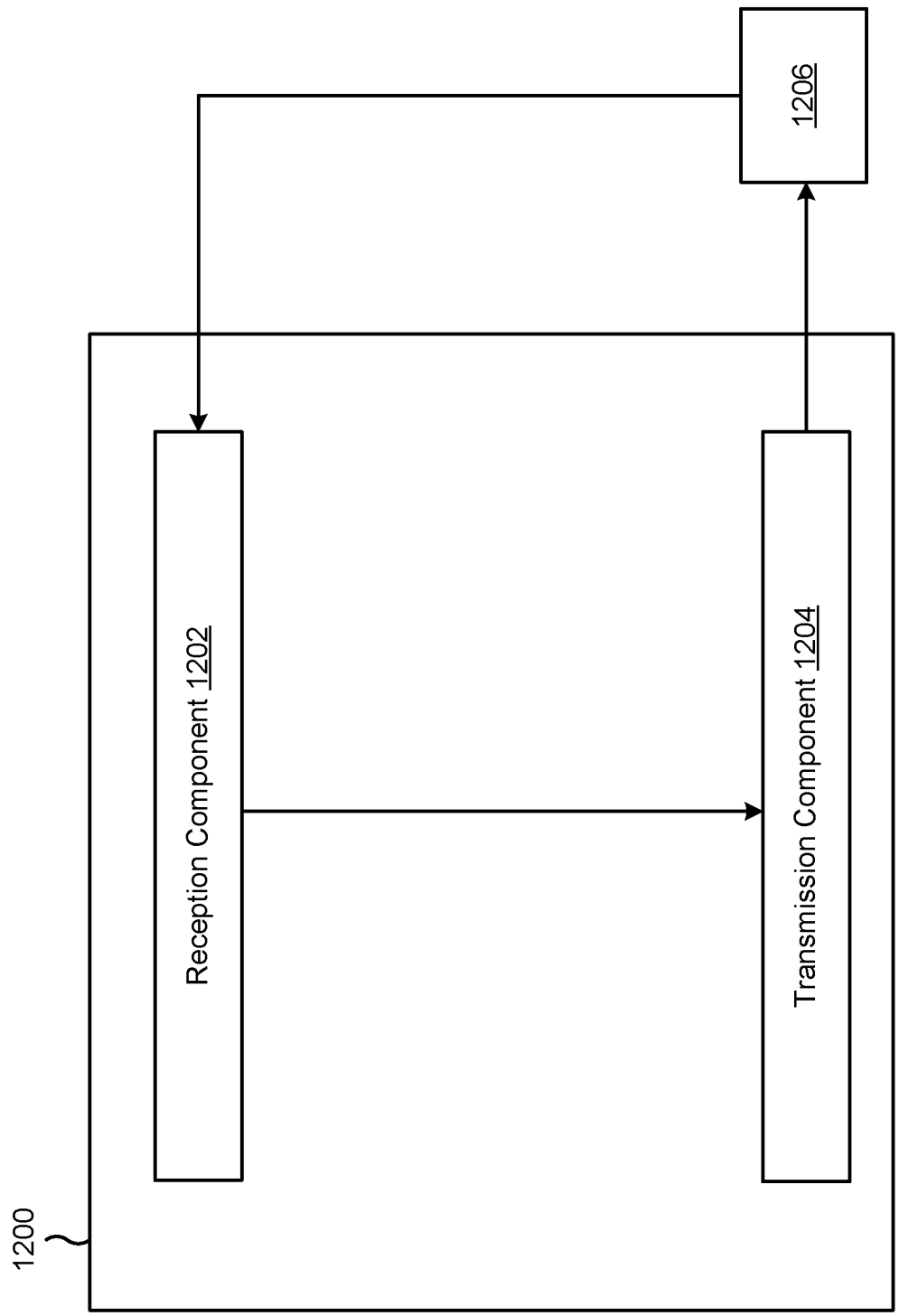
FIGS. 12-13 are block diagrams of example apparatuses for wireless communication, in accordance with the present disclosure.

FIG. 12 is a block diagram of an example apparatus 1200 for wireless communication. The apparatus 1200 may be a control node, or a control node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIG. 9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the control node described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the control node described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the control node described above in connection with FIG. 2. In some aspects, the transmission component 1204 may be co-located with the reception component 1202 in a transceiver.

The reception component 1202 may receive, from a wireless node, a status report of an unlicensed band associated with an unlicensed channel access of the wireless node, wherein the status report indicates LBT failures during the unlicensed channel access of the wireless node. The transmission component 1204 may transmit, to the wireless node, an updated configuration for unlicensed channel access based at least in part on the status report of the unlicensed band.

The transmission component 1204 may transmit, to the wireless node, a configuration for unlicensed channel access, wherein the configuration indicates one or more of: channel access modes, channel access parameters, a measurement configuration, or a status report configuration. The transmission component 1204 may transmit, to the wireless node, a request for the status report, wherein the status report is received from the wireless node based at least in part on the request for the status report. The transmission component 1204 may transmit, to the wireless node, a configuration that configures a triggering condition for the wireless node to transmit the status report to the control node, wherein the triggering condition is associated with a periodic reporting of the status report or an aperiodic reporting of the status report due to an event occurrence.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
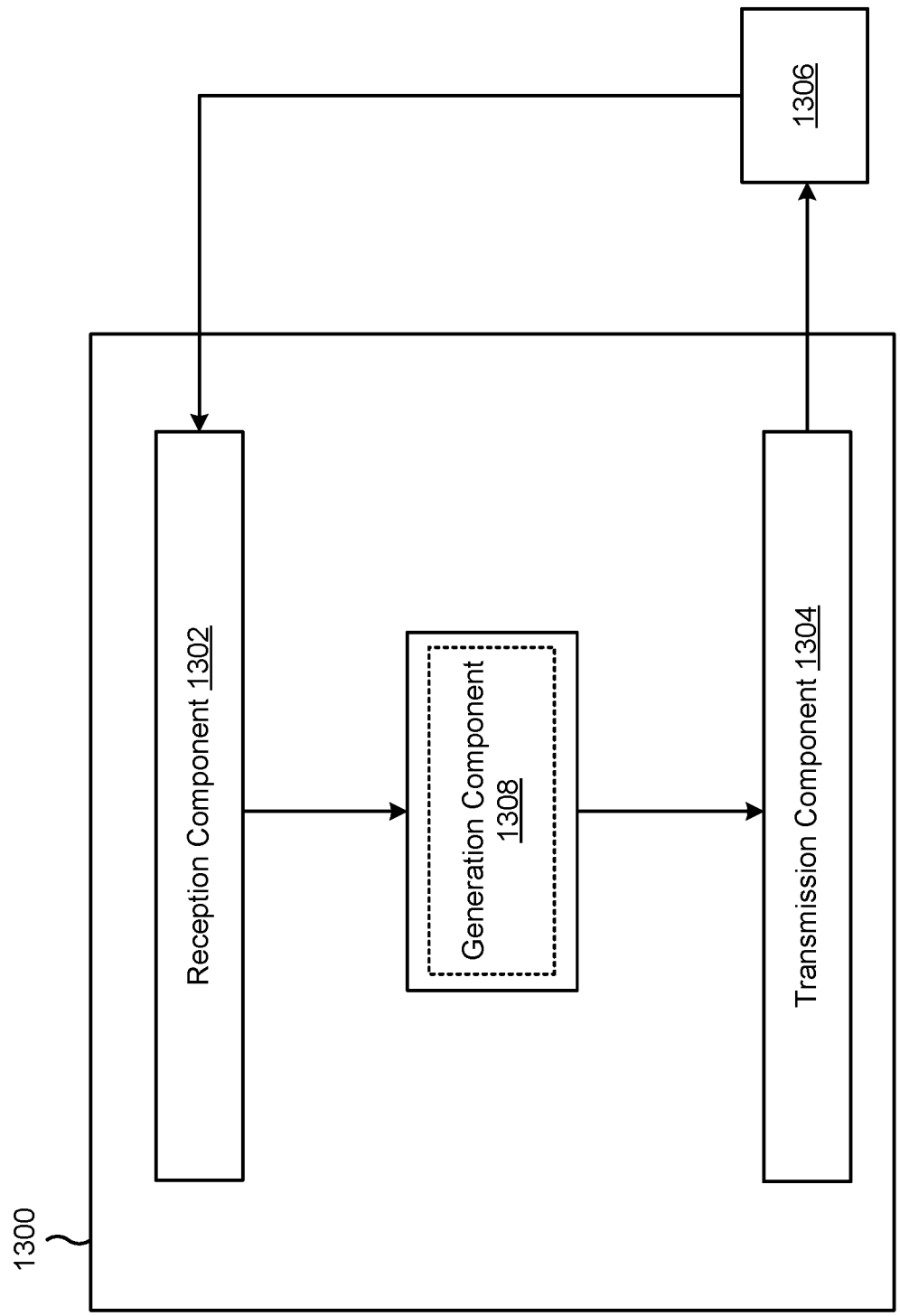

FIG. 13 is a block diagram of an example apparatus 1300 for wireless communication. The apparatus 1300 may be a wireless node, or a wireless node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a generation component 1308, among other examples.

In some aspects, the apparatus 1300 may be configured to perform one or more operations described herein in connection with FIG. 9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the wireless node described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the wireless node described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the wireless node described above in connection with FIG. 2. In some aspects, the transmission component 1304 may be co-located with the reception component 1302 in a transceiver.

The transmission component 1304 may transmit, to a control node, a status report of an unlicensed band associated with an unlicensed channel access of the wireless node, wherein the status report indicates LBT failures during the unlicensed channel access of the wireless node. The reception component 1302 may receive, from the control node, an updated configuration for unlicensed channel access based at least in part on the status report of the unlicensed band.

The reception component 1302 may receive, from the control node, a configuration for unlicensed channel access, wherein the configuration indicates one or more of: channel access modes, channel access parameters, a measurement configuration, or a status report configuration. The reception component 1302 may receive, from the control node, a request for the status report, wherein the status report is received from the wireless node based at least in part on the request for the status report. The reception component 1302 may receive, from the control node, a configuration that configures a triggering condition for the wireless node to transmit the status report to the control node, wherein the triggering condition is associated with a periodic reporting of the status report or an aperiodic reporting of the status report due to an event occurrence.

The generation component 1308 may generate the status report based at least in part on a channel sensing for an intended transmission via an allocation or scheduling. The generation component 1308 may generate the status report based at least in part on a channel sensing for a virtual transmission for a purpose of generating the status report.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a control node, comprising: receiving, from a wireless node, a status report of an unlicensed band associated with an unlicensed channel access of the wireless node, wherein the status report indicates listen-before-talk (LBT) failures during the unlicensed channel access of the wireless node; and transmitting, to the wireless node, an updated configuration for unlicensed channel access based at least in part on the status report of the unlicensed band.

Aspect 2: The method of Aspect 1, further comprising: transmitting, to the wireless node, a configuration for unlicensed channel access, wherein the configuration indicates one or more of: channel access modes, channel access parameters, a measurement configuration, or a status report configuration.

Aspect 3: The method of any of Aspects 1 through 2, wherein the status report indicating the LBT failures indicates actual failure events, wherein the actual failure events are associated with expected transmissions.

Aspect 4: The method of any of Aspects 1 through 3, wherein the status report indicating the LBT failures includes virtual failure events, wherein the virtual failure events are associated with virtual transmissions, and one or more detection thresholds are configured for channel sensing of the virtual transmissions.

Aspect 5: The method of any of Aspects 1 through 4, wherein the status report indicates statistics associated with the LBT failures, wherein the statistics indicate one or more of: an LBT success rate, an LBT failure rate, a pattern of LBT failure in a time domain, in a frequency domain, or in a spatial domain, or an average quantity of sensing slots to pass LBT.

Aspect 6: The method of any of Aspects 1 through 5, wherein the status report indicates information associated with channel sensing measurements, wherein the information indicates averaged or filtered measurement results or statistics associated with the measurement results.

Aspect 7: The method of any of Aspects 1 through 6, wherein the status report indicates communication failures during a channel occupancy after an LBT.

Aspect 8: The method of any of Aspects 1 through 7, further comprising: transmitting, to the wireless node, a request for the status report, wherein the status report is received from the wireless node based at least in part on the request for the status report.

Aspect 9: The method of any of Aspects 1 through 8, further comprising: transmitting, to the wireless node, a configuration that configures a triggering condition for the wireless node to transmit the status report to the control node, wherein the triggering condition is associated with a periodic reporting of the status report or an aperiodic reporting of the status report due to an event occurrence.

Aspect 10: The method of any of Aspects 1 through 9, wherein the control node is a first control node, and further comprising: transmitting the status report to a second control node or a peer node.

Aspect 11: The method of any of Aspects 1 through 10, wherein the updated configuration for unlicensed channel access indicates an updated channel access mode or an updated LBT mode based at least in part on the status report, wherein the updated LBT mode includes one or more of: a message-based LBT mode, a receiver-assisted LBT mode, a no-LBT mode, or a conditional no-LBT mode.

Aspect 12: The method of any of Aspects 1 through 11, wherein the updated configuration for unlicensed channel access indicates updated channel access parameters or adjusted channel sensing parameters based at least in part on the status report, wherein the adjusted channel sensing parameters indicate an energy detection threshold or a periodicity for a frame-based LBT mode.

Aspect 13: The method of any of Aspects 1 through 12, wherein the updated configuration for unlicensed channel access indicates an updated status report configuration based at least in part on the status report, wherein the updated status report configuration indicates one or more of: a triggering condition, a frequency of status reporting, or an indication to include additional information in a subsequent status report.

Aspect 14: The method of any of Aspects 1 through 13, wherein the updated configuration for unlicensed channel access indicates an updated resource configuration to reduce a rate of the LBT failures, wherein the updated resource configuration indicates resources in one or more of a time domain, a frequency domain, or a spatial domain, and the updated resource configuration indicates transmit powers or modulation and coding scheme values associated with the resources.

Aspect 15: The method of any of Aspects 1 through 14, wherein the updated configuration for unlicensed channel access indicates one or more of: an updated semi-static resource allocation for a control channel to avoid resources with an LBT failure rate that satisfies a threshold; or an updated semi-static resource allocation for a semi-persistent scheduled or configured grant data transmission to avoid resources with the LBT failure rate that satisfies the threshold.

Aspect 16: The method of any of Aspects 1 through 15, wherein the updated configuration for unlicensed channel access indicates scheduling constraints for upcoming transmissions, wherein the scheduling constraints are associated with a transmit power, modulation and coding scheme values, time-frequency resources, or a set of transmit beams.

Aspect 17: The method of any of Aspects 1 through 16, wherein the updated configuration for unlicensed channel access indicates a change to a primary cell or to one or more secondary cells, wherein the primary cell is associated with an LBT success rate that satisfies a threshold.

Aspect 18: The method of any of Aspects 1 through 17, wherein the updated configuration for unlicensed channel access indicates an updated resource pattern, wherein unavailable resources are aligned with an LBT failure pattern in a time domain, a frequency domain, and a spatial domain based at least in part on the updated resource pattern.

Aspect 19: The method of any of Aspects 1 through 18, wherein the updated configuration for unlicensed channel access indicates a topology or routing table to avoid nodes having an LBT failure rate that satisfies a threshold.

Aspect 20: The method of any of Aspects 1 through 19, wherein the updated configuration for unlicensed channel access indicates one or more redundant paths based at least in part on nodes having an LBT failure rate that satisfies a threshold.

Aspect 21: The method of any of Aspects 1 through 20, wherein the wireless node is associated with multiple entities, and the status report is associated with the multiple entities associated with the wireless node.

Aspect 22: The method of any of Aspects 1 through 21, wherein the wireless node is associated with multiple entities, and the status report includes separate status reports for each of the multiple entities associated with the wireless node.

Aspect 23: The method of any of Aspects 1 through 22, wherein the status report and the updated configuration for unlicensed channel access are carried via one or more of: an F1 access protocol interface between the control node and the wireless node, a radio resource control interface between the control node and the wireless node, a medium access control control element, downlink control information, or uplink control information, a PC5 sidelink connection between the control node and the wireless node, an Internet Protocol connection between the control node and the wireless node, or a WiFi link between the control node and the wireless node.

Aspect 24: The method of any of Aspects 1 through 23, wherein: the status report is received over an unlicensed band or a licensed band between the control node and the wireless node; and the updated configuration for unlicensed channel access is transmitted over the unlicensed band or the licensed band between the control node and the wireless node.

Aspect 25: The method of any of Aspects 1 through 24, wherein: the control node is a base station centralized unit (gNB-CU) in an access network; and the wireless node is a base station distributed unit (gNB-DU), an access user equipment, a repeater, or a transmit-receive point in the access network.

Aspect 26: The method of any of Aspects 1 through 25, wherein: the control node is a base station distributed unit (gNB-DU) in an access network; and the wireless node is a repeater, a radio unit, or a transmit-receive point in the access network.

Aspect 27: The method of any of Aspects 1 through 26, wherein: the control node is an integrated access backhaul donor centralized unit (IAB-donor CU) in an IAB network; and the wireless node is an IAB node, an access user equipment, a repeater, or a transmit-receive point in the IAB network.

Aspect 28: The method of any of Aspects 1 through 27, wherein: the control node is a first integrated access backhaul (IAB) node in an IAB network; and the wireless node is a second IAB node in the IAB network, wherein the first IAB node is a parent of the second IAB node, the first IAB node is a child of the second IAB node, or the first IAB node and the second IAB node are connected via a PC5 sidelink connection.

Aspect 29: The method of any of Aspects 1 through 28, wherein: the control node is an application server in a WiFi network; and the wireless node is a WiFi access point or an access terminal in the WiFi network.

Aspect 30: A method of wireless communication performed by a wireless node, comprising: transmitting, to a control node, a status report of an unlicensed band associated with an unlicensed channel access of the wireless node, wherein the status report indicates listen-before-talk (LBT) failures during the unlicensed channel access of the wireless node; and receiving, from the control node, an updated configuration for unlicensed channel access based at least in part on the status report of the unlicensed band.

Aspect 31: The method of Aspect 30, further comprising: receiving, from the control node, a configuration for unlicensed channel access, wherein the configuration indicates one or more of: channel access modes, channel access parameters, a measurement configuration, or a status report configuration.

Aspect 32: The method of any of Aspects 30 through 31, wherein the status report indicating the LBT failures indicates actual failure events, wherein the actual failure events are associated with expected transmissions.

Aspect 33: The method of any of Aspects 30 through 32, wherein the status report indicating the LBT failures includes virtual failure events, wherein the virtual failure events are associated with virtual transmissions, and one or more detection thresholds are configured for channel sensing of the virtual transmissions.

Aspect 34: The method of any of Aspects 30 through 33, wherein the status report indicates statistics associated with the LBT failures, wherein the statistics indicate one or more of: an LBT success rate, an LBT failure rate, a pattern of LBT failure in a time domain, in a frequency domain, or in a spatial domain, or an average quantity of sensing slots to pass LBT.

Aspect 35: The method of any of Aspects 30 through 34, wherein the status report indicates information associated with channel sensing measurements, wherein the information indicates averaged or filtered measurement results or statistics associated with the measurement results.

Aspect 36: The method of any of Aspects 30 through 35, wherein the status report indicates communication failures during a channel occupancy after an LBT.

Aspect 37: The method of any of Aspects 30 through 36, further comprising: receiving, from the control node, a request for the status report, wherein the status report is received from the wireless node based at least in part on the request for the status report.

Aspect 38: The method of any of Aspects 30 through 37, further comprising: receiving, from the control node, a configuration that configures a triggering condition for the wireless node to transmit the status report to the control node, wherein the triggering condition is associated with a periodic reporting of the status report or an aperiodic reporting of the status report due to an event occurrence.

Aspect 39: The method of any of Aspects 30 through 38, further comprising: generating the status report based at least in part on a channel sensing for an intended transmission via an allocation or scheduling; or generating the status report based at least in part on a channel sensing for a virtual transmission for a purpose of generating the status report.

Aspect 40: The method of any of Aspects 30 through 39, wherein the updated configuration for unlicensed channel access indicates an updated channel access mode or an updated LBT mode based at least in part on the status report, wherein the updated LBT mode includes one or more of: a message-based LBT mode, a receiver-assisted LBT mode, a no-LBT mode, or a conditional no-LBT mode.

Aspect 41: The method of any of Aspects 30 through 40, wherein the updated configuration for unlicensed channel access indicates updated channel access parameters or adjusted channel sensing parameters based at least in part on the status report, wherein the adjusted channel sensing parameters indicate an energy detection threshold or a periodicity for a frame-based LBT mode.

Aspect 42: The method of any of Aspects 30 through 41, wherein the updated configuration for unlicensed channel access indicates an updated status report configuration based at least in part on the status report, wherein the updated status report configuration indicates one or more of: a triggering condition, a frequency of status reporting, or an indication to include additional information in a subsequent status report.

Aspect 43: The method of any of Aspects 30 through 42, wherein the updated configuration for unlicensed channel access indicates an updated resource configuration to reduce a rate of the LBT failures, wherein the updated resource configuration indicates resources in one or more of a time domain, a frequency domain, or a spatial domain, and the updated resource configuration indicates transmit powers or modulation and coding scheme values associated with the resources.

Aspect 44: The method of any of Aspects 30 through 43, wherein the updated configuration for unlicensed channel access indicates one or more of: an updated semi-static resource allocation for a control channel to avoid resources with an LBT failure rate that satisfies a threshold; or an updated semi-static resource allocation for a semi-persistent scheduled or configured grant data transmission to avoid resources with the LBT failure rate that satisfies the threshold.

Aspect 45: The method of any of Aspects 30 through 44, wherein the updated configuration for unlicensed channel access indicates scheduling constraints for upcoming transmissions, wherein the scheduling constraints are associated with a transmit power, modulation and coding scheme values, time-frequency resources, or a set of transmit beams.

Aspect 46: The method of any of Aspects 30 through 45, wherein the updated configuration for unlicensed channel access indicates a change to a primary cell or to one or more secondary cells, wherein the primary cell is associated with an LBT success rate that satisfies a threshold.

Aspect 47: The method of any of Aspects 30 through 46, wherein the updated configuration for unlicensed channel access indicates an updated resource pattern, wherein unavailable resources are aligned with an LBT failure pattern in a time domain, a frequency domain, and a spatial domain based at least in part on the updated resource pattern.

Aspect 48: The method of any of Aspects 30 through 47, wherein the updated configuration for unlicensed channel access indicates a topology or routing table to avoid nodes having an LBT failure rate that satisfies a threshold.

Aspect 49: The method of any of Aspects 30 through 48, wherein the updated configuration for unlicensed channel access indicates one or more redundant paths based at least in part on nodes having an LBT failure rate that satisfies a threshold.

Aspect 50: The method of any of Aspects 30 through 49, wherein the wireless node is associated with multiple entities, and the status report is associated with the multiple entities associated with the wireless node.

Aspect 51: The method of any of Aspects 30 through 50, wherein the wireless node is associated with multiple entities, and the status report includes separate status reports for each of the multiple entities associated with the wireless node.

Aspect 52: The method of any of Aspects 30 through 51, wherein the status report and the updated configuration for unlicensed channel access are carried via one or more of: an F1 access protocol interface between the control node and the wireless node, a radio resource control interface between the control node and the wireless node, a medium access control control element, downlink control information, or uplink control information, a PC5 sidelink connection between the control node and the wireless node, an Internet Protocol connection between the control node and the wireless node, or a WiFi link between the control node and the wireless node.

Aspect 53: The method of any of Aspects 30 through 52, wherein: the status report is transmitted over an unlicensed band or a licensed band between the control node and the wireless node; and the updated configuration for unlicensed channel access is received over the unlicensed band or the licensed band between the control node and the wireless node.

Aspect 54: The method of any of Aspects 30 through 53, wherein: the control node is a base station centralized unit (gNB-CU) in an access network; and the wireless node is a base station distributed unit (gNB-DU), an access user equipment, a repeater, or a transmit-receive point in the access network.

Aspect 55: The method of any of Aspects 30 through 54, wherein: the control node is a base station distributed unit (gNB-DU) in an access network; and the wireless node is a repeater, a radio unit, or a transmit-receive point in the access network.

Aspect 56: The method of any of Aspects 30 through 55, wherein: the control node is an integrated access backhaul donor centralized unit (IAB-donor CU) in an IAB network; and the wireless node is an IAB node, an access user equipment, a repeater, or a transmit-receive point in the IAB network.

Aspect 57: The method of any of Aspects 30 through 56, wherein: the control node is a first integrated access backhaul (IAB) node in an IAB network; and the wireless node is a second IAB node in the IAB network, wherein the first IAB node is a parent of the second IAB node, the first IAB node is a child of the second IAB node, or the first IAB node and the second IAB node are connected via a PC5 sidelink connection.

Aspect 58: The method of any of Aspects 30 through 57, wherein: the control node is an application server in a WiFi network; and the wireless node is a WiFi access point or an access terminal in the WiFi network.

Aspect 59: An apparatus for wireless communication at a device, comprising a processor; memory coupled with the processor; and instructions stored in the memory and executable by the processor to cause the apparatus to perform the method of one or more Aspects of Aspects 1-29.

Aspect 60: A device for wireless communication, comprising a memory and one or more processors coupled to the memory, the memory and the one or more processors configured to perform the method of one or more Aspects of Aspects 1-29.

Aspect 61: An apparatus for wireless communication, comprising at least one means for performing the method of one or more Aspects of Aspects 1-29.

Aspect 62: A non-transitory computer-readable medium storing code for wireless communication, the code comprising instructions executable by a processor to perform the method of one or more Aspects of Aspects 1-29.

Aspect 63: A non-transitory computer-readable medium storing a set of instructions for wireless communication, the set of instructions comprising one or more instructions that, when executed by one or more processors of a device, cause the device to perform the method of one or more Aspects of Aspects 1-29.

Aspect 64: An apparatus for wireless communication at a device, comprising a processor; memory coupled with the processor; and instructions stored in the memory and executable by the processor to cause the apparatus to perform the method of one or more Aspects of Aspects 30-58.

Aspect 65: A device for wireless communication, comprising a memory and one or more processors coupled to the memory, the memory and the one or more processors configured to perform the method of one or more Aspects of Aspects 30-58.

Aspect 66: An apparatus for wireless communication, comprising at least one means for performing the method of one or more Aspects of Aspects 30-58.

Aspect 67: A non-transitory computer-readable medium storing code for wireless communication, the code comprising instructions executable by a processor to perform the method of one or more Aspects of Aspects 30-58.

Aspect 68: A non-transitory computer-readable medium storing a set of instructions for wireless communication, the set of instructions comprising one or more instructions that, when executed by one or more processors of a device, cause the device to perform the method of one or more Aspects of Aspects 30-58.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a control node, comprising:
   transmitting, to a wireless node, a request for a status report of an unlicensed band associated with an unlicensed channel access of the wireless node;
   receiving, from the wireless node and based at least in part on transmitting the request, the status report, wherein the status report indicates:
      a quantity of listen-before-talk (LBT) failures during the unlicensed channel access of the wireless node, and
      communication failures during a channel occupancy after an LBT; and
   transmitting, to the wireless node, an updated configuration for unlicensed channel access for the wireless node based at least in part on the status report of the unlicensed band, wherein the control node is a base station control unit (gNB-CU) and the wireless node is a base station distributed unit (gNB-DU).

2. The method of claim 1, further comprising:
   transmitting, to the wireless node, an initial configuration for unlicensed channel access, wherein the initial configuration indicates one or more of: channel access modes, channel access parameters, a measurement configuration, or a status report configuration.

3. The method of claim 1, wherein the LBT failures are actual failure events associated with expected transmissions.

4. The method of claim 1, wherein:
   the updated configuration for unlicensed channel access for the wireless node indicates an updated channel access mode or an updated LBT mode based at least in part on the status report, wherein the updated LBT mode includes one or more of: a message-based LBT mode, a receiver-assisted LBT mode, a no-LBT mode, or a conditional no-LBT mode;
   the updated configuration for unlicensed channel access for the wireless node indicates updated channel access parameters or adjusted channel sensing parameters based at least in part on the status report, wherein the adjusted channel sensing parameters indicate an energy detection threshold or a periodicity for a frame-based LBT mode;
   the updated configuration for unlicensed channel access for the wireless node indicates an updated status report configuration based at least in part on the status report, wherein the updated status report configuration indicates one or more of: a triggering condition, a frequency of status reporting, or an indication to include additional information in a subsequent status report; or
   the updated configuration for unlicensed channel access for the wireless node indicates an updated resource configuration to reduce a rate of the LBT failures, wherein the updated resource configuration indicates resources in one or more of a time domain, a frequency domain, or a spatial domain, and the updated resource configuration indicates transmit powers or modulation and coding scheme values associated with the resources.

5. The method of claim 1, wherein the updated configuration for unlicensed channel access for the wireless node indicates one or more of:
   an updated semi-static resource allocation for a control channel to avoid resources with an LBT failure rate that satisfies a threshold; or
   an updated semi-static resource allocation for a semi-persistent scheduled or configured grant data transmission to avoid resources with the LBT failure rate that satisfies the threshold.

6. The method of claim 1, wherein:
   the updated configuration for unlicensed channel access for the wireless node indicates scheduling constraints for upcoming transmissions, wherein the scheduling constraints are associated with a transmit power, modulation and coding scheme values, time-frequency resources, or a set of transmit beams;
   the updated configuration for unlicensed channel access for the wireless node indicates a change to a primary cell or to one or more secondary cells, wherein the primary cell is associated with an LBT success rate that satisfies a threshold;
   the updated configuration for unlicensed channel access for the wireless node indicates an updated resource pattern, wherein unavailable resources are aligned with an LBT failure pattern in a time domain, a frequency domain, and a spatial domain based at least in part on the updated resource pattern;
   the updated configuration for unlicensed channel access for the wireless node indicates a topology or routing table to avoid nodes having an LBT failure rate that satisfies a threshold; or
   the updated configuration for unlicensed channel access for the wireless node indicates one or more redundant paths based at least in part on nodes having an LBT failure rate that satisfies a threshold.

7. The method of claim 1, wherein:
the wireless node is associated with multiple entities, and the status report is associated with the multiple entities associated with the wireless node; or
the wireless node is associated with the multiple entities, and the status report includes separate status reports for each of the multiple entities associated with the wireless node.

8. The method of claim 1, wherein the status report and the updated configuration for unlicensed channel access for the wireless node are carried via one or more of: an F1 access protocol interface between the control node and the wireless node, a radio resource control interface between the control node and the wireless node, a medium access control control element, downlink control information, or uplink control information, a PC5 sidelink connection between the control node and the wireless node, an Internet Protocol connection between the control node and the wireless node, or a WiFi link between the control node and the wireless node.

9. The method of claim 1, wherein:
the status report is received over an unlicensed band or a licensed band between the control node and the wireless node; and
the updated configuration for unlicensed channel access for the wireless node is transmitted over the unlicensed band or the licensed band between the control node and the wireless node.

10. The method of claim 1, wherein the gNB-CU and the gNB-DU are in an access network.

11. The method of claim 1, wherein the gNB-CU and the gNB-DU are in an IAB network.

12. The method of claim 1, wherein the status report further indicates information associated with channel sensing measurements, wherein the information indicates averaged measurement results.

13. A method of wireless communication performed by a wireless node, comprising:
receiving, from a control node, a request for a status report of an unlicensed band associated with an unlicensed channel access of the wireless node;
transmitting, to the control node, the status report, wherein the status report indicates:
a quantity of listen-before-talk (LBT) failures during the unlicensed channel access of the wireless node, and
communication failures during a channel occupancy after an LBT; and
receiving, from the control node, an updated configuration for unlicensed channel access for the wireless node based at least in part on the status report of the unlicensed band, wherein the control node is a base station control unit (gNB-CU) and the wireless node is a base station distributed unit (gNB-DU).

14. The method of claim 13, further comprising:
receiving, from the control node, a first initial configuration for unlicensed channel access, wherein the first initial configuration for unlicensed channel access indicates one or more of: channel access modes, channel access parameters, a measurement configuration, or a status report configuration; or
receiving, from the control node, a second initial configuration that configures a triggering condition for the wireless node to transmit the status report to the control node, wherein the triggering condition is associated with a periodic reporting of the status report or an aperiodic reporting of the status report due to an event occurrence.

15. The method of claim 13, further comprising:
generating the status report based at least in part on a channel sensing for an intended transmission via an allocation or scheduling; or
generating the status report based at least in part on a channel sensing for a virtual transmission for a purpose of generating the status report.

16. The method of claim 13, wherein the LBT failures are actual failure events associated with expected transmissions.

17. A control node for wireless communication, comprising:
memory; and
one or more processors, coupled to the memory, configured to:
transmit, to a wireless node, a request for a status report of an unlicensed band associated with an unlicensed channel access of the wireless node;
receive, from the wireless node, the status report, wherein the status report indicates:
a quantity of listen-before-talk (LBT) failures during the unlicensed channel access of the wireless node, and
communication failures during a channel occupancy after an LBT; and
transmit, to the wireless node, an updated configuration for unlicensed channel access for the wireless node based at least in part on the status report of the unlicensed band, wherein the control node is a base station control unit (gNB-CU) and the wireless node is a base station distributed unit (gNB-DU).

18. The control node of claim 17, wherein the LBT failures are actual failure events associated with expected transmissions.

19. The control node of claim 17, wherein:
the updated configuration for unlicensed channel access for the wireless node indicates an updated channel access mode or an updated LBT mode based at least in part on the status report, wherein the updated LBT mode includes one or more of: a message-based LBT mode, a receiver-assisted LBT mode, a no-LBT mode, or a conditional no-LBT mode;
the updated configuration for unlicensed channel access for the wireless node indicates updated channel access parameters or adjusted channel sensing parameters based at least in part on the status report, wherein the adjusted channel sensing parameters indicate an energy detection threshold or a periodicity for a frame-based LBT mode;
the updated configuration for unlicensed channel access for the wireless node indicates an updated status report configuration based at least in part on the status report, wherein the updated status report configuration indicates one or more of: a triggering condition, a frequency of status reporting, or an indication to include additional information in a subsequent status report; or
the updated configuration for unlicensed channel access for the wireless node indicates an updated resource configuration to reduce a rate of the LBT failures, wherein the updated resource configuration indicates resources in one or more of a time domain, a frequency domain, or a spatial domain, and the updated resource configuration indicates transmit powers or modulation and coding scheme values associated with the resources.

20. The control node of claim 17, wherein the updated configuration for unlicensed channel access for the wireless node indicates one or more of:
- an updated semi-static resource allocation for a control channel to avoid resources with an LBT failure rate that satisfies a threshold; or
- an updated semi-static resource allocation for a semi-persistent scheduled or configured grant data transmission to avoid resources with the LBT failure rate that satisfies the threshold.

21. The control node of claim 17, wherein:
- the updated configuration for unlicensed channel access for the wireless node indicates scheduling constraints for upcoming transmissions, wherein the scheduling constraints are associated with a transmit power, modulation and coding scheme values, time-frequency resources, or a set of transmit beams;
- the updated configuration for unlicensed channel access for the wireless node indicates a change to a primary cell or to one or more secondary cells, wherein the primary cell is associated with an LBT success rate that satisfies a threshold;
- the updated configuration for unlicensed channel access for the wireless node indicates an updated resource pattern, wherein unavailable resources are aligned with an LBT failure pattern in a time domain, a frequency domain, and a spatial domain based at least in part on the updated resource pattern;
- the updated configuration for unlicensed channel access for the wireless node indicates a topology or routing table to avoid nodes having an LBT failure rate that satisfies a threshold; or
- the updated configuration for unlicensed channel access for the wireless node indicates one or more redundant paths based at least in part on nodes having an LBT failure rate that satisfies a threshold.

22. The control node of claim 17, wherein the status report and the updated configuration for unlicensed channel access for the wireless node are carried via one or more of: an F1 access protocol interface between the control node and the wireless node, a radio resource control interface between the control node and the wireless node, a medium access control control element, downlink control information, or uplink control information, a PC5 sidelink connection between the control node and the wireless node, an Internet Protocol connection between the control node and the wireless node, or a WiFi link between the control node and the wireless node.

23. The control node of claim 17, wherein the status report further indicates information associated with channel sensing measurements, wherein the information indicates averaged measurement results.

24. The control node of claim 17, wherein the gNB-CU and the gNB-DU are in an access network.

25. The control node of claim 17, wherein the gNB-CU and the gNB-DU are in an IAB network.

26. A wireless node for wireless communication, comprising:
- memory; and
- one or more processors, coupled to the memory, configured to:
  - receive, from a control node, a request for a status report of an unlicensed band associated with an unlicensed channel access of the wireless node;
  - transmit, to the control node, the status report, wherein the status report indicates:
    - a quantity of listen-before-talk (LBT) failures during the unlicensed channel access of the wireless node, and
    - communication failures during a channel occupancy after an LBT; and
  - receive, from the control node, an updated configuration for unlicensed channel access for the wireless node based at least in part on the status report of the unlicensed band, wherein the control node is a base station control unit (gNB-CU) and the wireless node is a base station distributed unit (gNB-DU).

27. The wireless node of claim 26, wherein the LBT failures are actual failure events associated with expected transmissions.

28. The wireless node of claim 26, wherein:
- the updated configuration for unlicensed channel access for the wireless node indicates an updated channel access mode or an updated LBT mode based at least in part on the status report, wherein the updated LBT mode includes one or more of: a message-based LBT mode, a receiver-assisted LBT mode, a no-LBT mode, or a conditional no-LBT mode;
- the updated configuration for unlicensed channel access for the wireless node indicates updated channel access parameters or adjusted channel sensing parameters based at least in part on the status report, wherein the adjusted channel sensing parameters indicate an energy detection threshold or a periodicity for a frame-based LBT mode;
- the updated configuration for unlicensed channel access for the wireless node indicates an updated status report configuration based at least in part on the status report, wherein the updated status report configuration indicates one or more of: a triggering condition, a frequency of status reporting, or an indication to include additional information in a subsequent status report; or
- the updated configuration for unlicensed channel access for the wireless node indicates an updated resource configuration to reduce a rate of the LBT failures, wherein the updated resource configuration indicates resources in one or more of a time domain, a frequency domain, or a spatial domain, and the updated resource configuration indicates transmit powers or modulation and coding scheme values associated with the resources.

29. The wireless node of claim 26, wherein the updated configuration for unlicensed channel access for the wireless node indicates one or more of:
- an updated semi-static resource allocation for a control channel to avoid resources with an LBT failure rate that satisfies a threshold; or
- an updated semi-static resource allocation for a semi-persistent scheduled or configured grant data transmission to avoid resources with the LBT failure rate that satisfies the threshold.

30. The wireless node of claim 26, wherein:
- the updated configuration for unlicensed channel access for the wireless node indicates scheduling constraints for upcoming transmissions, wherein the scheduling constraints are associated with a transmit power, modulation and coding scheme values, time-frequency resources, or a set of transmit beams;
- the updated configuration for unlicensed channel access for the wireless node indicates a change to a primary cell or to one or more secondary cells, wherein the primary cell is associated with an LBT success rate that satisfies a threshold;

the updated configuration for unlicensed channel access for the wireless node indicates an updated resource pattern, wherein unavailable resources are aligned with an LBT failure pattern in a time domain, a frequency domain, and a spatial domain based at least in part on the updated resource pattern;

the updated configuration for unlicensed channel access for the wireless node indicates a topology or routing table to avoid nodes having an LBT failure rate that satisfies a threshold; or the updated configuration for unlicensed channel access for the wireless node indicates one or more redundant paths based at least in part on nodes having an LBT failure rate that satisfies a threshold.

* * * * *